United States Patent
Goto et al.

(10) Patent No.: US 8,093,878 B2
(45) Date of Patent: Jan. 10, 2012

(54) SWITCHING POWER SUPPLY DEVICE

(75) Inventors: Katsuya Goto, Ohita (JP); Takahiro Miyazaki, Hayami-Gun (JP)

(73) Assignee: Texas Instruments Incorporated, Dallas, TX (US)

( * ) Notice: Subject to any disclaimer, the term of this patent is extended or adjusted under 35 U.S.C. 154(b) by 370 days.

(21) Appl. No.: 12/510,525

(22) Filed: Jul. 28, 2009

(65) Prior Publication Data

US 2010/0019749 A1    Jan. 28, 2010

(30) Foreign Application Priority Data

Jul. 28, 2008 (JP) .................................. 2008194203

(51) Int. Cl.
*G05F 1/40* (2006.01)
(52) U.S. Cl. ........................................ 323/285; 323/271
(58) Field of Classification Search .................. 323/222, 323/223, 225, 268, 271, 282–285, 288
See application file for complete search history.

(56) References Cited

U.S. PATENT DOCUMENTS

| | | | | |
|---|---|---|---|---|
| 6,538,418 B2* | 3/2003 | Miyazaki | ...................... | 323/284 |
| 6,879,137 B2* | 4/2005 | Sase et al. | ..................... | 323/282 |
| 7,595,621 B2* | 9/2009 | Nishimori | ..................... | 323/284 |
| 2004/0070382 A1* | 4/2004 | Walters et al. | ................ | 323/284 |

* cited by examiner

*Primary Examiner* — Matthew Nguyen
(74) *Attorney, Agent, or Firm* — William B. Kempler; Wade J. Brady, III; Frederick J. Telecky, Jr.

(57) ABSTRACT

A switching power supply device for a ripple control system that can obtain the ripple component with the necessary amplitude without using discrete elements. On capacitor Ci of CR integrator 11, a voltage is generated corresponding to the integration value of the voltage applied to inductor Lo. The ripple voltage generated on capacitor Ci has a waveform similar to that of the ripple current flowing through inductor Lo. The voltage of capacitor Ci is converted into current Iq by voltage/current converter 12, and the current is injected in resistor R3 arranged on the transmission path of output feedback voltage VFB in comparator 2. Resistor R3 generates ripple voltage (Iqxr3) corresponding to the ripple current flowing through inductor Lo. The synthetic voltage of the ripple voltage and output feedback voltage VFB is compared to reference voltage Vref.

17 Claims, 16 Drawing Sheets

SWITCHING POWER SUPPLY DEVICE

FIELD OF THE INVENTION

The present invention pertains to a switching power supply device with high efficiency and high-speed response. For example, the present invention pertains to a switching power supply device of the ripple control system that controls the output on the basis of comparing the ripple component of the output to a threshold value.

With rapid popularization of cell phones and other mobile devices, there is an increasing demand for improved performance of switching power supply devices for mobile equipment. Great efforts have been made to develop such techniques as low-voltage operation, high efficiency and quick response, and fewer parts in the switching power supply device.

FIG. 17 is a diagram illustrating a constitutional example of the switching power supply device of the voltage mode system in the prior art. In the example shown in FIG. 17, a voltage buck-type converter is composed of MOS transistors MH, ML, inductor Lo and capacitor Co. Here, the voltage buck-type converter alternately turns on the MOS transistor MH on the high side and MOS transistor ML on the low side, and generates output voltage Vo, which is lower than input voltage Vin. When a continuous current flows through inductor Lo, output voltage Vo is approximately proportional to the duty ratio (ratio of on time to switching period) of MOS transistor MH on the high side.

An error amplifier is composed of resistors R31-R34, capacitors C31-C33, and op/amp 101. Said error amplifier amplifies the error between reference voltage Vref and VFB corresponding to output voltage Vout. Comparator 102 compares the error signal output from the error amplifier to the sawtooth signal output from sawtooth wave generator 103. Corresponding to the result of comparator, a PWM signal is generated. Said PWM signal varies the pulse width corresponding to the level of the error signal. Here, gate driver 105 has a low-side driver for driving the gate of MOS transistor ML and a high-side driver for driving the gate of MOS transistor MH. The low-side driver generates a gate driving voltage corresponding to the PWM signal, and the high-side driver generates a driving voltage corresponding to the signal obtained by inverting the PWM signal with inverter 104. With said constitution, when the error between output voltage Vout and reference voltage Vref increases, the duty ratio of MOS transistor MH is adjusted so that said error is decreased.

In order to prevent the feedback control system of the switching power supply device of the voltage mode system from becoming unstable due to a delay in the phase generated at the resonance frequency of inductor Lo and capacitor Co, the loop gain in the high frequency region is set to a relatively low level, so that the response speed is usually low. In recent years, in order to reduce the power consumption, a scheme has been adopted in which the power supply voltage is dynamically changed corresponding to the operating state of the equipment, and the switching power supply device requires a high-speed response. However, in the voltage mode system, due to the aforementioned constitution, it cannot well meet the demands for higher speed. Also, because it is necessary to arrange resistors R33-R34 and capacitors C31-C33 as stand-alone elements (discrete elements) for phase compensation, the size of the substrate is increased, and the cost of assembly rises, which is undesirable. Also, many man-hours are required to evaluate the appropriate element values, which is also undesired.

In order to solve the aforementioned problems pertaining to the voltage mode system, there is the ripple control system (see Takashi Kabeshima and 3 others: "Control characteristics of voltage buck-type converter by means of hysteresis PWM control using CR integrator," Denshi Joho Tsushin Gakkai Ronbunshi [IEICE Papers], published by The Institute of Electronics, Information and Communication Engineers, May 2006, Vol. J89-B, No. 5, pp. 664-672). The ripple control system is also called bang-bang control, hysteresis PWM control, D-cap mode, etc.

FIG. 18 is a diagram illustrating an example of constitution of the switching power supply device of the ripple control system in the prior art.

Here, the series circuit of resistors R31 and R32 divides output voltage Vout, and inputs output feedback voltage VFB to comparator 102. Said comparator 102 compares feedback voltage VFB to reference voltage Vref. If feedback voltage VFB is less than reference voltage Vref, it outputs a "1," and if feedback voltage VFB is greater than reference voltage Vref, it outputs a "0." Said controller 106 generates a control signal that turns on the MOS transistor MH and turns off the MOS transistor ML only for a prescribed time when the output of comparator 102 changes from "0" to "1."

When MOS transistor MH is turned on while MOS transistor ML is turned off, voltage (Vin−Vout) is applied to inductor Lo, so that the current flowing through inductor Lo rises linearly. On the other hand, when MOS transistor MH is turned off while MOS transistor ML is turned on, output voltage Vout, whose polarity is opposite that of said output voltage, is applied to inductor Lo. Consequently, the current flowing through inductor Lo falls linearly. That is, a sawtooth ripple current flows through inductor Lo. This ripple current flows through equivalent series resistance ESR of capacitor Co, so that a ripple voltage similar to the ripple current is superimposed on output voltage V0. In the switching power supply device of the ripple control system shown in FIG. 18, feedback control is performed so that the trough of the ripple component superimposed on feedback voltage VFB is approximately equal to the reference voltage Vref in steady state. In the ripple control system, there is no need for phase compensation as would be required in the voltage mode system, so that it can realize a high-speed load response.

However, in order to ensure stable operation of the control system in the ripple control system, a ripple component with an appropriate amplitude should be contained in feedback voltage VFB. Assuming that the ripple component of output voltage Vout is "Vorp," the resistances of resistors R31, R32 are "r31," "r32," respectively, then ripple component Vfrp of output feedback voltage VFB can be represented by the following formula.

(Mathematical Formula 1)

$$Vfrp = Vorp \times (r31/(r31+r32)) \tag{1}$$

In order to increase ripple component Vfrp of output feedback voltage VFB in the ripple control system shown in FIG. 18, for example, one may change the resistance ratio of resistors R31 and R32, or connect a capacitor in parallel with resistor R32. However, when there is also a limit in such a case, ripple component Vorp of output voltage Vout must be increased.

Efforts have been made to reduce the power consumption by decreasing the operating voltage of LSI of memory, CPU, etc., and by decreasing the output voltage required for the power supply system to less than 1 V. In this state, a larger ripple component of the power supply voltage leads to a decrease in the LSI operating margin, which is undesirable from the standpoint of system reliability.

BACKGROUND OF THE INVENTION

As a method for realizing stable feedback control without increasing the ripple component of the output voltage itself in the ripple control system, for example, there is the scheme using a CR integrator described in Takashi Kabeshima and 3 others: "Control characteristics of voltage buck-type converter by means of hysteresis PWM control using CR integrator," Denshi Joho Tsushin Gakkai Ronbunshi [IEICE Papers], published by The Institute of Electronics, Information and Communication Engineers, May 2006, Vol. J89-B, No. 5, pp. 664-672. In this scheme, a signal similar to the ripple current flowing through inductor Lo is retrieved by means of a CR integrator connected in parallel with inductor Lo, and the retrieved signal is superimposed on the output feedback voltage.

FIG. 19 is a diagram illustrating a constitutional example of the switching power supply device of the ripple control system using the ripple signal retrieved by the CR integrator.

In the switching power supply device shown in FIG. 19, the CR integrator made up of a series circuit of resistor R35 and capacitor C35 is connected in parallel with inductor Lo. At capacitor C35, a ripple voltage similar to the ripple current flowing through inductor Lo is generated. The connection node between resistor R35 and capacitor C35 is connected to the connection node between resistors R31 and R32 via capacitor C34, so that the ripple voltage generated at capacitor C35 is superimposed on output feedback voltage VFB.

FIG. 20 is a diagram illustrating an example of the signal waveforms at the various portions in the switching power supply device shown in FIG. 19.

Even when the ripple voltage of output voltage Vout is relatively low (FIG. 20(B)), ripple voltage Vrp with a sufficient amplitude at output feedback voltage VFB is obtained (FIG. 20(C)). When the trough of output feedback voltage VFB is less than reference voltage Vref, gate-source voltage Vgs of MOS transistor MH goes to the high level for a prescribed time (FIG. 20(A)). The switching power supply device shown in FIG. 19 superimposed ripple voltage Vrp with an appropriate amplitude on output feedback voltage VFB, so that even when the ripple voltage of output voltage Vout is relatively low, it is still possible to have stable operation of the control system, which is advantageous.

However, in the ripple control system, because control is performed so that the peak and trough of the ripple component are in agreement with reference voltage Vref, so that the amplitude of ripple voltage Vrp is not very large. If the amplitude of ripple voltage Vrp is too large, the deviation between the DC level defined by reference voltage Vref and the DC level of actual output voltage Vout increases, which is undesirable for guaranteeing the DC precision of output voltage Vout. Consequently, the amplitude of ripple voltage Vrp must be set within an appropriate range in consideration of the accuracy required for output voltage Vout. However, in this case, in consideration of the overall switching frequency requirement, the time constant of CR integrator (R35, C35) may have to be made larger. If the capacitance of the capacitor were, e.g., several thousand pF, it would be difficult to form it on a semiconductor chip, and it would have to be assembled as a discrete element on the substrate.

Usually, in the switching power supply device shown in FIG. 19, resistor R35 and capacitors C34, C35 must be assembled as discrete elements on a substrate, so that the size of the substrate increases, as does the cost of assembly of the elements, which is undesirable.

SUMMARY OF THE INVENTION

A general object of the present invention is to solve the aforementioned problems of the prior art by providing a switching power supply device of the ripple control system characterized by the fact that it is possible to obtain the ripple component with the necessary amplitude without using discrete elements. An aspect of the present invention provides a switching power supply device characterized by the fact that it comprises a first capacitor that generates an output voltage, an inductor set on the current supply path to said first capacitor, a switching circuit that switches the voltage applied to said inductor corresponding to the input control signal, a ripple signal generator that generates a ripple signal corresponding to the ripple current flowing through said inductor on the basic of the voltage applied to said inductor, wherein said ripple signal generator has an integrator containing a second capacitor that generates a voltage corresponding to the integration value of the voltage applied to said inductor; a comparator that compares the synthetic signal of the voltage feedback signal corresponding to said output voltage and said ripple signal with a reference signal, or compares said synthetic signal of the ripple signal and reference signal with the voltage feedback signal corresponding to said output voltage; and a controller that generates said control signal corresponding to the comparison result of said comparator so that the peak or trough of said synthetic signal is equal to said reference signal or said voltage feedback signal; and an amplitude converter that generates said ripple signal, which is a signal similar to the ripple voltage generated at said second capacitor, whose amplitude is less than said ripple voltage.

With said switching power supply device, at said second capacitor of said integrator, a voltage corresponding to the integration value of the voltage applied to said inductor is generated, and a signal similar to the ripple voltage generated at the second capacitor is generated by said amplitude converter as a ripple signal corresponding to the ripple current flowing through said inductor. The amplitude of said ripple signal is converted by said amplitude converter so that it decreases the ripple voltage of said second capacitor. As a result, even if the time constant of said integrator is small, it is still possible to convert the amplitude of said ripple signal into an appropriate amplitude, so that it is possible to form said integrator with elements with appropriate element values that allow integration on the semiconductor chip.

In an aspect, said comparator contains a first resistor arranged in the transmission path of said voltage feedback signal or the transmission path of said reference signal, and said amplitude converter contains a voltage/current converter that converts the ripple voltage generated in said second capacitor into a current that is injected into said first resistor.

For example, the following scheme may be adopted: said comparator contains a first buffer circuit to which said voltage feedback signal is input, a second buffer circuit to which said reference signal is input, and an amplifier section that amplifies the voltage difference between said voltage feedback signal input via said first buffer circuit and said reference voltage input via said second buffer circuit; said first resistor is arranged in the path for transmission of said voltage feedback signal from said first buffer circuit to said amplifier section, or in the path for transmission of said reference signal from said second buffer circuit to said amplifier section; and said current/voltage converter injects said converted current into the signal transmission path between said first resistor and said amplifier section.

In this case, the following scheme may be adopted: said current/voltage converter also injects current equivalent to said converted current injected via said first resistor to the output of one buffer circuit of said first buffer circuit and said second buffer circuit into the other buffer circuit of said first buffer circuit and said second buffer circuit.

In an aspect, said amplitude converter contains a voltage divider circuit that divides the voltage generated on said second capacitor, and said voltage/current converter converts the voltage obtained by said voltage divider circuit into current.

In an aspect, said inductor and said first capacitor are connected in series. Also, the following scheme may be adopted: said switching circuit switches the voltage applied to said series circuit corresponding to said control signal; said integrator is connected in series with said series circuit; said amplitude converter contains a first voltage divider circuit that divides the voltage the generated at said second capacitor, and a second voltage divider circuit that divides said output voltage generated at said first capacitor with a voltage division ratio equivalent to said first voltage divider circuit; said current/voltage converter converts the difference of voltage obtained by said first voltage divider circuit and that obtained by said second voltage divider circuit.

In an aspect, said amplitude converter contains a voltage divider circuit that divides the voltage generated at said second capacitor, and an amplifier that amplifies/attenuates the voltage obtained by said voltage divider circuit.

The following scheme may be adopted: said inductor and said first capacitor are connected in series; said switching circuit switches the voltage applied to said series circuit; said integrator is connected in series with said series circuit; and said amplitude converter has a first voltage divider circuit that divides the voltage generated at said second capacitor, a second voltage divider circuit that divides said output voltage generated at said first capacitor with a voltage division ratio equal to that of said first voltage divider circuit, and a circuit that attenuates or amplifies the difference in voltage obtained by dividing said first voltage divider circuit and that obtained by dividing said second voltage divider circuit.

In an aspect, said amplitude converter contains a first signal synthesis circuit that synthesizes the ripple voltage generated at said second capacitor and said voltage feedback signal; and said comparator compares the synthetic signal of said first signal synthesis circuit and said reference signal.

For example, the following scheme may be adopted: said reference signal is input to said first signal synthesis circuit instead of said voltage feedback signal, and said circuit generates a DC offset component containing said synthetic signal so that said synthetic signal output is equivalent to said reference signal when zero voltage is input instead of the ripple voltage generated at said second capacitor.

In an aspect, said amplitude converter has a second signal synthesis circuit that synthesizes the ripple voltage generated at said second capacitor and said reference signal; and said comparator compares the synthetic signal of said second signal synthesis circuit and said voltage feedback signal.

In an aspect, said comparator contains a first amplifier section that generates a first differential current corresponding to the voltage difference between said voltage feedback signal and said reference signal, a second amplifier section that generates a second differential current corresponding to the voltage difference between the two ends of said second capacitor, a first current synthesis node that synthesizes one current of said first differential current and one current of said second differential current, a second current synthesis node that synthesizes the other current of said first differential current and the other current of said second differential current, a first load circuit in which the synthetic current of said first current synthesis node flows, a second load circuit in which the synthetic current of said second current synthesis node flows, and a third amplifier section that amplifies the voltage difference between the voltage generated in said first load circuit and the voltage generated in said second load circuit.

An aspect of the present invention also provides a switching power supply device characterized by the following facts: the switching power supply device has an input terminal that receives the input voltage, an output terminal that outputs the output voltage, a first switching transistor connected between said input terminal and the first node, a second switching transistor, which is connected between said first node and the reference potential, and which performs an operation complementary to that of said first switching transistor, an inductance element connected between said first node and said output terminal, an output capacitance element connected between said output terminal and reference potential, a voltage divider circuit, which is connected to said output terminal and generates a feedback voltage corresponding to said output voltage, a ripple voltage detector that detects the ripple voltage, which is contained in said feedback voltage and corresponds to the switching operation of said switching transistor, a comparator that compares the sum of said feedback voltage and said ripple voltage and outputs the comparison result, and a controller that turns on/off said first and second switching transistors corresponding to said comparison result; said ripple voltage detector contains a differential circuit connected to said inductance element; the on-time of said first switching transistor is defined by the product of the ratio of said output voltage to said input voltage and the switching period of said first and second switching transistors.

REFERENCE NUMERALS AND SYMBOLS AS SHOWN IN THE DRAWINGS

In the figures, 1 and 1A-1E represent ripple signal generators, 2 and 2D represent comparators, 3 represents a controller, 4 represents a driver, 11 and 11B represent CR integrators, 12 and 171 represent voltage/current converters, 13, 13B and 14 represent voltage divider circuits, 15 and 17 represent signal synthesizers, 16 represents an amplitude converter, 21 represents an output amplifier, 151-153, 172 and 173 represent amplifiers, Lo represents an inductor, Ci and Co represent capacitor, CS1-CS10 represent current sources, MH and ML represent MOS transistors, M1-M10 represent MOS transistors, Q1, Q2, and Q5-Q10 represent npn transistors, Q3 and Q4 represent pnp transistors, R1-R24 represent resistors, Rf1 and Rf2 represent resistors, Vref represents a reference voltage, VFB represents an output feedback voltage.

DESCRIPTION OF THE EMBODIMENTS

According to an aspect of the switching power supply device of the ripple control system of the present invention, the amplitude of the ripple voltage generated at the capacitor of said integrator is converted to generate the ripple signal, so that it is possible to obtain the necessary ripple component with the necessary amplitude without using discrete elements.

Embodiment 1

Figure 1:
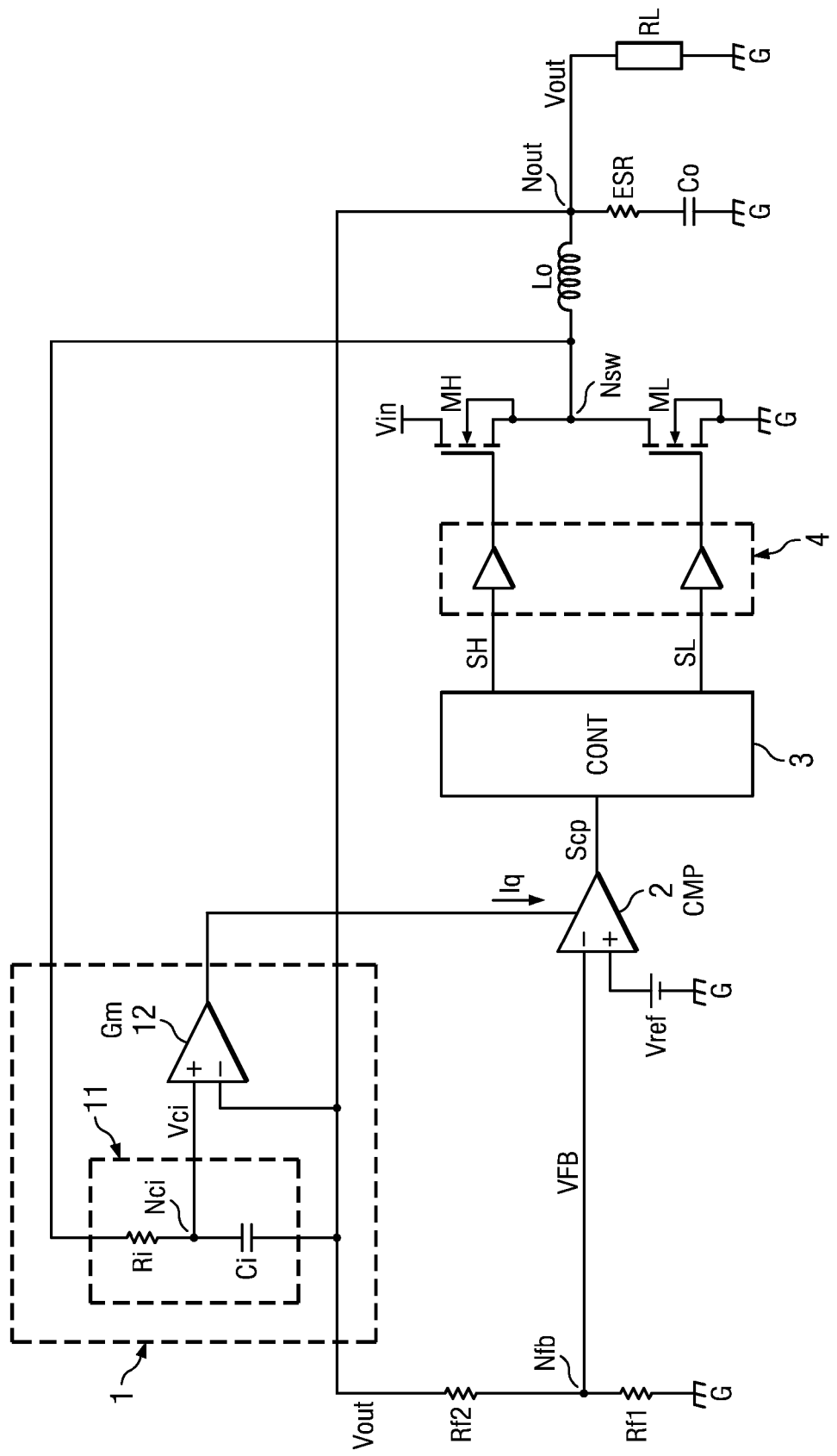
FIG. 1 is a diagram illustrating a constitutional example of the switching power supply device in Embodiment 1.

FIG. 1 is a diagram illustrating a constitutional example of the switching power supply device in Embodiment 1 of the present invention.

The switching power supply device shown in FIG. 1 comprises the following parts: ripple signal generator 1, comparator 2, controller 3, driver 4, resistors Rf1, Rf2 for voltage feedback, N-type MOS transistors ML and MH, inductor Lo, and capacitor Co. Said ripple signal generator 1 has CR integrator 11 consisting of capacitor Ci and resistor Ri, and voltage/current converter 12.

Capacitor Co is an embodiment of the first capacitor in the present invention. Inductor Lo is an embodiment of the inductor in the present invention. MOS transistors ML and MH represent an embodiment of the switching circuit in the present invention. Said ripple signal generator 1 is an embodiment of the ripple signal generator of the present invention. Said comparator 2 is an embodiment of the comparator of the present invention. CR integrator 11 is an embodiment of the integrator of the present invention. Capacitor Ci is an embodiment of the second capacitor of the present invention.

Said voltage/current converter 12 is an embodiment of the voltage/current converter of the present invention. Said MOS transistor ML is connected between node Nsw and reference potential G, and MOS transistor MH is connected between the feeding line of input voltage Vin and node Nsw. Said driver 4 drives the gate of MOS transistor ML of the MOS transistor corresponding to control signal SL, and, at the same time, it drives the gate of MOS transistor MH corresponding to control signal SH. Said inductor Lo is connected between node Nsw and node Nout. Said capacitor Co is connected between node Nout and reference potential G. Said capacitor Co has equivalent series resistance ESR. Load RL is connected to said node Nout. For example, said load RL represents an LSI or another electronic circuit that receives voltage Vout generated at node Nout and operates.

Said resistors Rf1, Rf2 are connected in series between node Nout and reference potential G. Said resistor Rf1 is connected between node Nfb and reference potential G, and resistor Rf2 is connected between node Nout and node Nfb. Node Nfb generates output feedback voltage VFB obtained by voltage division using the series circuit of resistors Rf1, Rf2. Said CR integrator 11 is composed of a series circuit of resistor Ri and capacitor Ci, and it is connected in parallel with inductor Lo. Said resistor Ri is connected between node Nsw and node Nci, and capacitor Ci is connected between node Nci and node Nout.

When 1 cycle period of switching by means of MOS transistors ML and MH is much shorter than the time constant of CR integrator 11, variation in the voltage of capacitor Ci during 1 cycle period (that is, the amplitude of the ripple voltage of capacitor Ci) is much smaller than the amplitude of the voltage with a square wave shape applied to inductor Lo, so that it can be ignored. In this case, the current flowing through resistor Ri is almost proportional to the voltage applied to inductor Lo. Because capacitor Ci is charged/discharged by means of the current flowing through resistor Ri, the voltage generated at capacitor Ci is approximately proportional to the integration value of the voltage applied to inductor Lo. Here, because the current flowing through inductor Lo is proportional to the integration value of the voltage applied to inductor Lo, the waveform of the ripple voltage generated on capacitor Ci is similar to the waveform of the ripple current flowing through inductor Lo.

Said voltage/current converter 12 is a circuit that converts the voltage generated at capacitor Ci into a current. For example, as shown in the following formula, current Iq is generated corresponding to the product of the voltage generated at capacitor Ci and the prescribed mutual conductance gm.

(Mathematical Formula 2)

$$Iq = (Vci - Vout) \times gm = Vid \times gm \quad (2)$$

Figure 2:
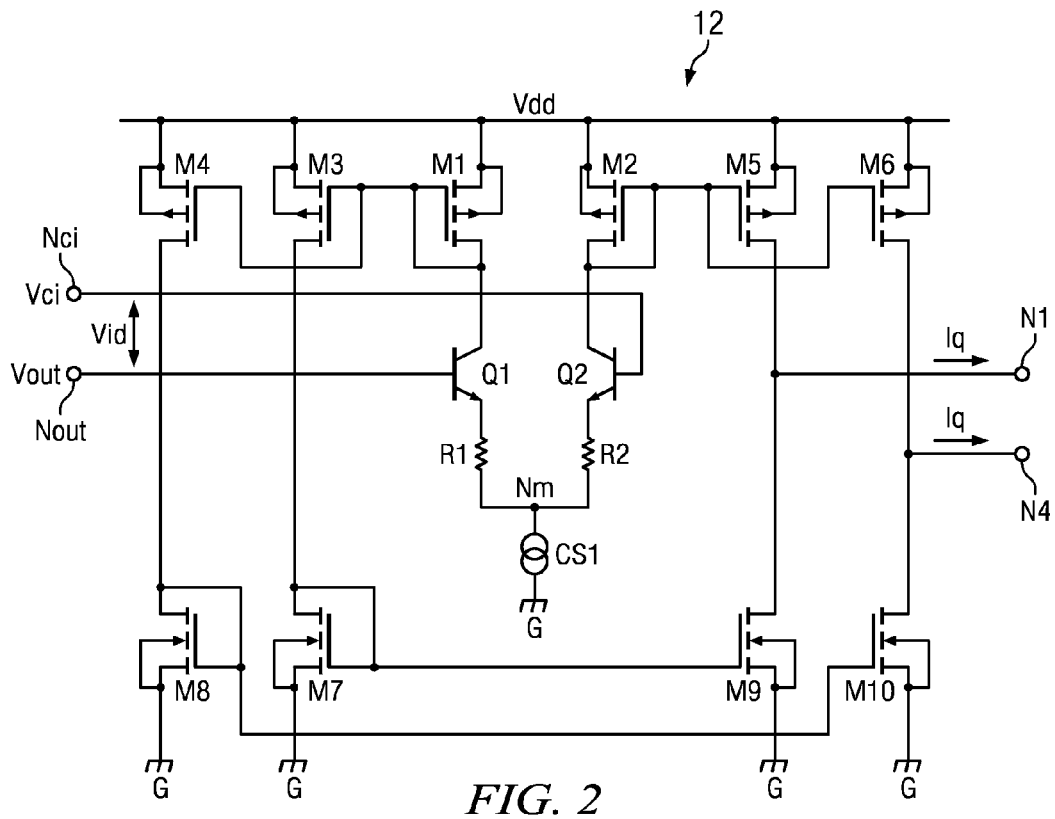
FIG. 2 is a diagram illustrating a constitutional example of the voltage/current converter.

FIG. 2 is a diagram illustrating a constitutional example of voltage/current converter 12.

Said voltage/current converter 12 shown in FIG. 2 has p-type MOS transistors M1-M6, n-type MOS transistors M7-M10, npn transistors Q1, Q2, resistors R1, R2, and current source CS1. The emitter of npn transistor Q1 is connected to node Nm via resistor R1. Its collector is connected to the drain of MOS transistor M1, and its base is connected to node Nout. The emitter of npn transistor Q2 is connected to node Nm via resistor R2, its collector is connected to the drain of MOS transistor M2, and its base is connected to node Nci. Current source CS1 is connected between node Nm and reference potential G. The sources of MOS transistors M1-M6 are connected to power supply line Vdd. The gate and drain of MOS transistor M1 are connected in common, and the gates of MOS transistors M3, M4 are connected to the gate of MOS transistor M1. The gate and drain of MOS transistor M2 are connected in common, and the gates of MOS transistors M5, M6 are connected to the gate of MOS transistor M2. The drain of MOS transistor M3 is connected to the drain of MOS transistor M7. The drain of MOS transistor M4 is connected to the drain of MOS transistor M8.

The sources of MOS transistors M7-M10 are connected to reference potential G. The gate and drain of MOS transistor M7 are connected in common, and the gate of MOS transistor M9 is connected to the gate of MOS transistor M7. The gate and drain of MOS transistor M8 are connected in common, and the gate of MOS transistor M10 is connected to the gate of MOS transistor M8. The drain of MOS transistor M9 and the drain of MOS transistor M5 are connected in common to node N1. The drain of MOS transistor M10 and the drain of MOS transistor M6 are connected in common to node N4.

Voltage Vci is applied to the base of npn transistor Q2, and voltage Vout is applied to the base of npn transistor Q1. In the collector current of npn transistors Q1, Q2 as a pair, a difference in current corresponding to voltage difference Vid (=Vci−Vout) is generated.

Said MOS transistors M1, M3, M4, M7, M8, M9, M10 form a current mirror circuit. The drain current of MOS transistors M9-M10 is proportional to the drain current of MOS transistor M1. MOS transistors M2, M5, M6 on the other hand, form a current mirror circuit. The drain current of MOS transistors M5, M6 is proportional to the drain current of MOS transistor M2.

Here, since the drain current of MOS transistors M9, M10 is equal to the drain current of MOS transistor M1, and the drain current of MOS transistors M5, M6 is equal to the drain current of MOS transistor M2, current Iq corresponding to voltage difference Vid is output from nodes N1, N2.

Said mutual conductance gm of voltage/current converter 12 shown in FIG. 2 can be approximately represented by the following formula.

(Mathematical Formula 3)

$$gm=1/[r1+(0.026\times2/Ics2)] \qquad (3)$$

In formula 3, "r1" represents the resistance value of resistors R1, R2, and "Ics2" represents the current value of current source CS2.

The foregoing explanation concerned voltage/current converter 12. Said comparator 2 compares the synthetic signal of the ripple signal of capacitor Ci retrieved by voltage/current converter 12 and output feedback voltage VFB corresponding to voltage Vout to reference voltage Vref, and it outputs signal Scp corresponding to the comparison result. Said comparator 2 injects current Iq of voltage/current converter 12 into the resistor arranged on the transmission path of output feedback voltage VFB, and the synthetic signal of output feedback voltage VFB and the ripple signal generated by it are compared to reference voltage Vref.

Figure 3:
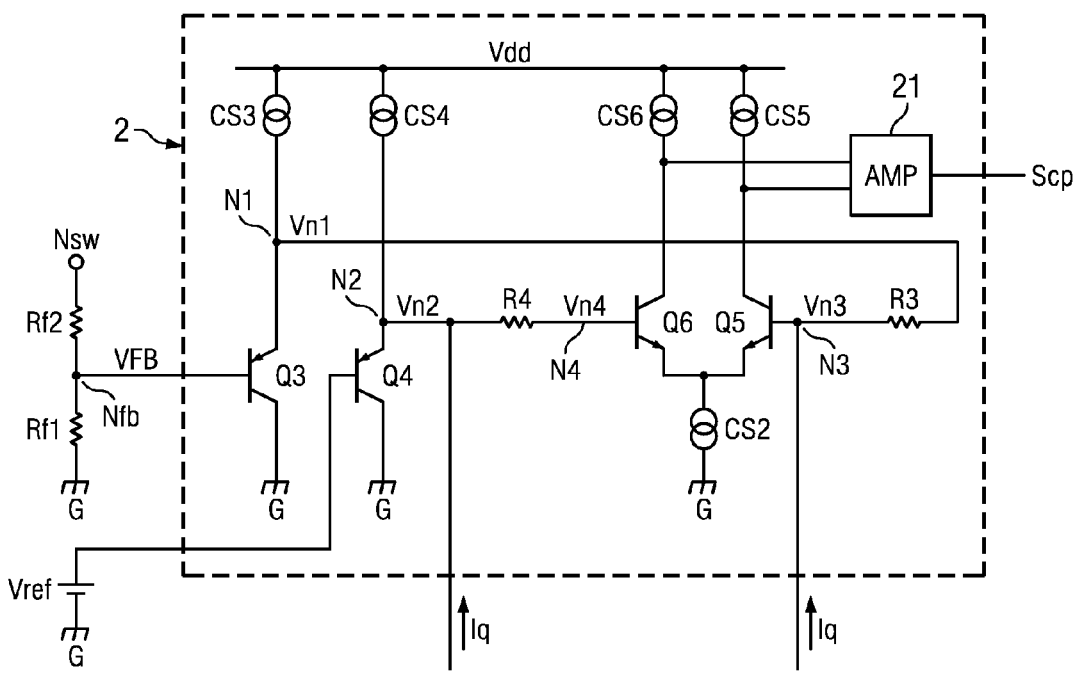
FIG. 3 is a diagram illustrating a constitutional example of the converter in the switching power supply device shown in FIG. 1.

FIG. 3 is a diagram illustrating a constitutional example of comparator 2.

As shown in FIG. 1, comparator 2 has pnp transistors Q3, Q4, npn transistors Q5, Q6, resistors R3, R4, current sources CS2-CS6, and output amplifier 21. The circuit containing pnp transistor Q3 and current source CS3 is an embodiment of the first buffer circuit of the present invention. The circuit containing pnp transistor Q4 and current source CS4 is an embodiment of the second buffer circuit of the present invention. The circuit containing npn transistors Q5, Q6 and current sources CS2, CS5, CS6 represents an embodiment of the amplifier section of the present invention. Resistor R3 is an embodiment of the first resistor of the present invention. The collectors of pnp transistors Q3, Q4 are connected to reference potential G. The emitter of pnp transistor Q3 is connected to power supply line Vdd via current source CS3, and its base is connected to node Nfb. The emitter of pnp transistor Q4 is connected to power supply line Vdd via current source CS4, and reference voltage Vref is input to its base.

The emitters of npn transistors Q5, Q6 are connected in common, and current source CS2 is connected between its emitter and reference potential G. The collector of npn transistor Q5 is connected to power supply line Vdd via current source CS5, and its base is connected to the emitter of pnp transistor Q3 via resistor R3. The collector of npn transistor Q6 is connected via current source CS6 to power supply line Vdd, and its base is connected via resistor R4 to the emitter of pnp transistor Q4.

As shown in FIG. 3, node N1 indicates the emitter of pnp transistor Q3, node N2 represents the emitter of pnp transistor Q4, node N3 represents the base of npn transistor Q5, and node N4 represents the base of npn transistor Q6.

Said output amplifier 21 amplifies the difference in collector voltage between npn transistors Q5, Q6, and generates signal Scp at the high level or the low level. Said pnp transistor Q3 and current source CS3 form a buffer circuit (emitter follower) with high input impedance and low output impedance. At the emitter of pnp transistor Q3 (node N1), output feedback voltage VFB generates voltage Vn1 with its level shifted by almost a constant base-emitter voltage. Said pnp transistor Q4 and current source CS4 form a buffer circuit (emitter follower), and, at the emitter (node N2) of pnp transistor Q4, voltage Vn2 obtained by level shift of reference voltage Vref is generated.

Output voltages Vn1, Vn2 of said two buffer circuits are input to the differential amplifier composed of npn transistors Q5, Q6 and current sources CS2, CS5, CS6. Said differential amplifier amplifies the difference of voltages input to the bases of npn transistors Q5, Q6, and outputs the difference of the collector voltage.

When injection of current Iq is not considered, in the differential amplifier, the voltage difference between voltages Vn1 and Vn2, that is, the voltage difference between output feedback voltage VFB and reference voltage Vref is amplified.

In comparator 2 shown in FIG. 3, resistor R3 is arranged in the transmission path of voltage Vn1 from said buffer circuit Q3, CS3 to the differential amplifier, and current Iq is injected from the base side (the side of node N3) of npn transistor Q5 with respect to said resistor R3. When the base resistance of npn transistor Q5 is sufficiently large, most of current Iq flows to the buffer circuit Q3, CS3, via resistor R3 so that a voltage corresponding to current Iq is generated at the two ends of resistor R3. Voltage Vn3 as sum of the voltage generated at resistor R3 and voltage Vn1 at node N1 is input to the base of npn transistor Q5.

On the other hand, resistor R4 is arranged on the transmission path of voltage Vn2 from buffer circuit Q4, CS4 to the differential amplifier. In this path, current Iq is injected to the output side of the buffer circuit, that is, the emitter (node N2) of pnp transistor Q4.

When current Iq is injected to node N2, equivalent current Iq is injected into said two buffer circuits. As a result, the DC balance of the emitter currents of pnp transistors Q3, Q4 can be improved, and the imbalance of the two base-emitter voltages can be reduced, so that it is possible to realize the effect of reduction of the input offset voltage.

Because the output impedance of said buffer circuit Q4, CS4 is much lower than the impedance at the base of npn transistor Q6, most of the current Iq injected into node N2 flows to buffer circuit Q4, CS4 instead of resistor R4. When the base current of npn transistor Q6 is ignored, voltage Vn4 input to the base of npn transistor Q6 is approximately equal to voltage Vn2 of node N2. That is, voltage Vn4 without the superimposed ripple signal due to current Iq is input to the base of npn transistor Q6.

In this way, with the differential amplifier consisting of npn transistors Q5, Q6, the difference between voltage Vn3, which has the superimposed ripple signal due to current Iq, and voltage Vn4 without the superimposed ripple signal is amplified. The result of the amplified difference is further amplified by output amplifier 21 to generate logic signal Scp.

The foregoing explanation concerned comparator 2.

Controller 3 generates control signals SL, SH that turn on/off said MOS transistors ML and MH corresponding to signal Sp output from comparator 2. For example, when signal Sp of comparator 2 is input, which indicates that voltage Vn3 with the superimposed ripple signal is less than voltage Vn4, control signals SL, SH are generated that work such that while MOS transistor MH is turned on for a prescribed time, MOS transistor ML is turned off. As a result, in the steady state, output voltage Vout is controlled so that the bottom of voltage Vn3 becomes approximately equal to voltage Vn4. For example, assuming that the period of switching is T, the input voltage is Vin, the output voltage is Vout, and the on period of transistor MH (off period of transistor HL) is Ton, there is the following relationship Ton=T·(Vout/Vin).

In the following, an explanation will be given regarding the operation of the switching power supply device with said constitution.

Figure 4:
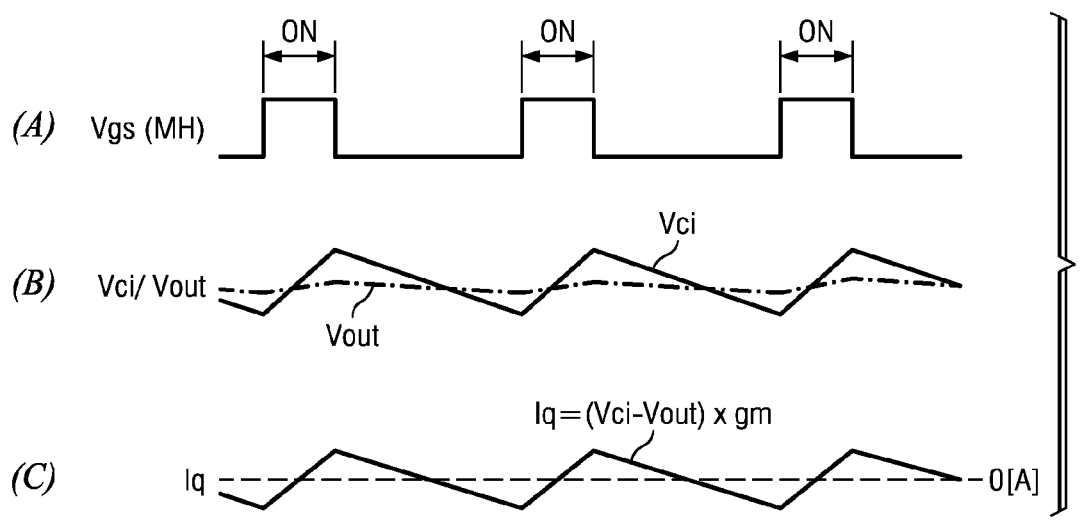
FIG. 4 is a diagram illustrating an example of the waveforms of the voltage generated in the CR integrator and the current in the voltage/current converter.

FIG. 4 is a diagram illustrating the waveform of voltage Vci generated by CR integrator 11 and current Iq of voltage/current converter 12.

For example, as shown in FIG. 4(A), MOS transistor MH receives gate-source voltage Vgs and is turned on periodically, and MOS transistor ML is turned off synchronously with the on period of MOS transistor MH. As MOS transistors ML and MH are alternately turned on, the voltage waveform of inductor Lo is a square wave.

When the switching period of MOS transistors ML and MH is much shorter than the time constant CR integrator 11, the current that charge and discharges capacitor Ci via resistor Ri is similar to the square wave voltage of inductor Lo. In this case, on capacitor Ci, ripple voltage Vrc is generated which is similar to the ripple signal flowing through inductor Lo.

Said ripple voltage Vrc can be approximately represented by the following formula.

(Mathematical Formula 4)

$$Vrc = (VL/r3) \times (1/c2) \times (VBout/Vin) \times (1/fs) \quad (4)$$

In formula 4, "VL" represents the voltage (Vin−Vout) of inductor Lo, and "fs" represents the switching frequency.

As shown in FIG. 4(B), voltage Vout generates a ripple voltage similar to the ripple current of inductor Lo, but its amplitude is smaller than the amplitude of the ripple voltage contained in voltage Vci. By using a ceramic capacitor or another element with less ESR as capacitor Co, the ripple voltage of output voltage Vout is very small.

Said voltage (Vci−Vout) of capacitor Ci is converted to current Iq into voltage/current converter 12. As shown in FIG. 4(B), voltage Vci at node Nci varies about output voltage Vout. In this case, said voltage (Vci−Vout) of capacitor Ci varies on the positive and negative sides, so that current Iq output from voltage/current converter 12 varies on the positive and negative sides (FIG. 4(C)).

Figure 5:
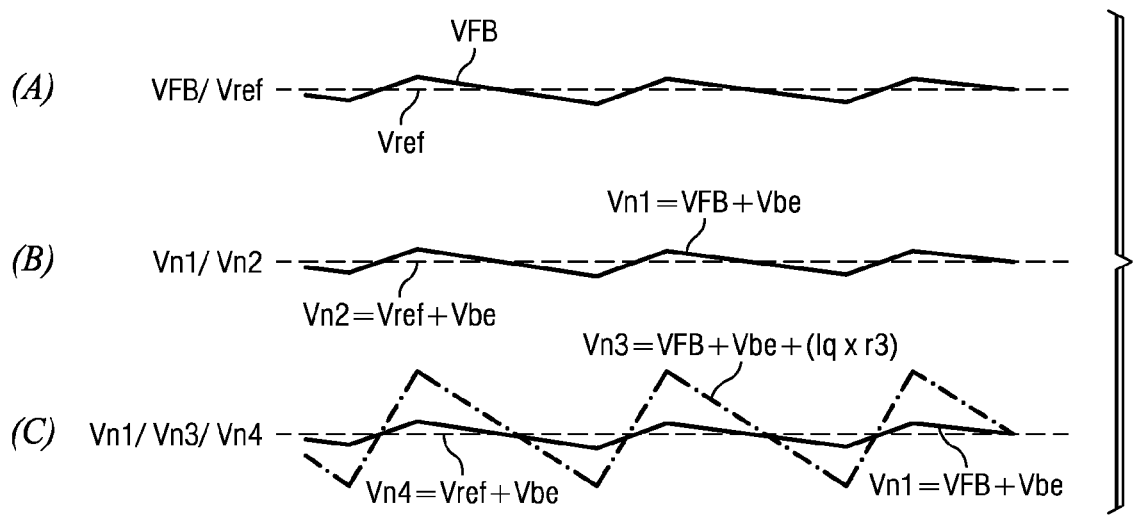
FIG. 5 is a diagram illustrating an example of the signal waveforms at the various portions of the converter shown in FIG. 3.

FIG. 5 is a diagram illustrating the signal waveforms at the various portions of comparator 2 shown in FIG. 3.

As shown in FIGS. 5(A), (B), at the output of buffer circuit Q3, CS3, the voltage becomes voltage Vn1 at the level shifted to the higher potential side by base-emitter voltage VBE of pnp transistor Q3. Also, at the output of buffer circuit Q4, CS4, the voltage becomes voltage Vn2 shifted to the higher potential side by base-emitter voltage Vbe of pnp transistor Q4.

When the base-emitter voltages (Vbe) of pnp transistors Q3, Q4 are equal, the potential difference between voltages Vn1 and Vn2 becomes equal to the potential difference between output feedback voltage VFB and reference voltage Vref. Said voltages Vn1, Vn2 are input via resistors R3, R4 to differential amplifiers Q5, Q6, CS2, CS5, CS6.

Current Iq injected into node N3 of comparator 2 does not flow into the base of npn transistor Q5, which has high input impedance. Instead, most of the current flows via resistor R3 to buffer circuit Q3, CS3. Consequently, voltage Vn3 at node N3 becomes approximately equal to the sum of ripple voltage (Iq×r3), which is generated by current Iq at resistor R3 (resistance value r3), and voltage Vn1 at node N1.

On the other hand, most of the current Iq injected into node N4 of comparator 2 flows into buffer circuit Q4, CS4, which has low impedance. As a result, the current flowing through resistor R4 is smaller, and voltage Vn4 at node N4 is approximately equal to voltage Vn2 at node N2. Consequently, voltage Vn3 with the superimposed ripple signal due to current Iq and Voltage Vn4 without the superimposed ripple signal are input to differential amplifiers Q5, Q6, CS2, CS5, CS6.

In said differential amplifiers Q5, Q6, CS2, CS5, CS6, the voltage difference between voltages Vn3 and Vn4 is amplified, and the obtained result of amplification is further amplified by output amplifier 21, generating logic signal Scp at the high level or low level depending on the magnitude relationship between voltages Vn3 and Vn4.

When logic signal Scp is generated by comparator 2 since voltage Vn3 is less than voltage Vn4, controller 3 turns on said MOS transistor MH for a prescribed time, and at the same time, it turns off said MOS transistor ML. Since MOS transistor MH is turned on, the voltage of node Nsw exceeds the voltage at node Nout, so that the voltage of capacitor Ci rises linearly. Correspondingly voltage Vn3 also rises linearly. After a prescribed time, MOS transistor MH is turned off and MOS transistor ML is turned on, so that the voltage at node Nsw becomes lower than the voltage of Voltage Vn3. As a result, the voltage of capacitor Ci falls linearly, and, correspondingly, voltage Vn3 also falls linearly. Consequently, in the steady state, the level near the bottom where voltage Vn3 transitions from falling to rising becomes equal to voltage Vn4.

As explained above, for the switching power supply device shown in FIG. 1, in capacitor Ci of CR integrator 11, a voltage corresponding to the integration value of the voltage applied to inductor Lo is generated. The ripple voltage generated at capacitor Ci has a waveform similar to that of the ripple current flowing through inductor Lo. This voltage of capacitor Ci is converted by voltage/current converter 12 to current Iq, and it is injected into resistor R3 arranged in the transmission path of output feedback voltage VFB in comparator 2. In resistor R3 (with resistance value r3), a ripple voltage corresponding to the ripple current flowing through inductor Lo (Iqxr3) is generated. As a result, in comparator 2, the synthetic signal of the ripple voltage (Iqxr3) corresponding to the ripple current flowing through inductor Lo and voltage Vn1 corresponding to output feedback voltage VFB is generated, and this voltage Vn3 is compared with voltage Vn4 corresponding to reference voltage Vref. Corresponding to output signal Scp of comparator 2, controller 3 controls switching of MOS transistors ML and MH so that the bottom (or peak) of voltage Vn3 is equal to voltage Vn4.

Here, the amplitude of the ripple voltage (Iqxr3) generated on resistor R3 (resistance value r3) of comparator 2 can be set at will corresponding to mutual conductance gm of voltage/current converter 12 and resistance r3. When the time constant of CR integrator 11 is small, the amplitude of ripple voltage Vrc generated on capacitor Ci may be set to a level that exceeds what is required. However, even in this case, by selecting appropriate mutual conductance gm and resistance r3, it is possible to convert the amplitude of ripple voltage (Iqxr3) generated by resistor R3 to an appropriate small amplitude. That is, a ripple signal similar to the ripple voltage generated on capacitor Ci and with amplitude smaller than that of the ripple voltage is generated, and this signal can be synthesized with output feedback voltage VFB.

Consequently, with the switching power supply device shown in FIG. 1, it is possible to set a small time constant of CR integrator 11 so that the element values of capacitor Ci and resistor Ri are appropriate for being formed on a semiconductor chip, and it is possible to reduce the number of discrete elements.

Because it is possible to reduce the number of discrete elements, it is possible for the circuit size to be smaller than that of the prior art, and, at the same time, it is possible to reduce the cost for assembling the elements. Also, it is possible to design an assembly of the elements more easily, and it is possible to reduce the man-hours required for design.

For the switching power supply device shown in FIG. 1, even when the ripple voltage of output voltage Vout is small as shown in FIG. 4(B), it is possible to retrieve the ripple signal with a sufficient amplitude for superimposition on output feedback voltage VFB. Consequently, it is possible to use a low ESR type capacitor as capacitor Co.

In switching power supply devices of the ripple control system of the prior art, in order to obtain a ripple voltage with an appropriate amplitude in the output voltage, for example, functional polymeric aluminum electrolytic capacitors, electroconductive polymeric aluminum solid-state capacitors, and other types of capacitors with relatively high ESR are used. Ceramic capacitors are less expensive than said capacitors and occupy less space, which is advantageous. However, because the ESR is very small, they usually cannot be used in the ripple control systems.

By means of the switching power supply device shown in FIG. 1, it is possible to use a ceramic capacitor with a small ESR as capacitor Co. Consequently, compared with the case when said aluminum electrolytic capacitor or the like is used, it is possible to reduce the cost of the elements, and at the same time, it is possible to reduce the circuit scale.

Also, in case of problems, the ceramic capacitor usually fails in the open state. Consequently, if a ceramic capacitor is used as capacitor Co, it is possible to improve the reliability compared to using a type of capacitor that short circuits in the case of failure.

In addition, for the switching power supply device shown in FIG. 1, it is possible to use a ceramic capacitor or another low ESR type capacitor as capacitor Co. Consequently, it is possible to reduce the ripple voltage of output voltage Vout. As a result, when output voltage Vout is used as the power supply voltage, it is possible to expand the operating margin of the electronic circuit, and it is possible to improve reliability.

For the switching power supply device shown in FIG. 1, there are buffer circuit Q3, CS3 to which output feedback voltage VFB is input and buffer circuit Q4, CS4 to which reference voltage Vref is input. A current equivalent to current Iq injected into resistor R3 connected to the output of said former buffer circuit Q3, CS3 is also injected to the output of latter buffer circuit Q3, CS3. As a result, the currents flowing into the two buffer circuits are balanced so that it is possible to reduce the input offset voltages of said two buffer circuits.

Embodiment 2

Embodiment 2 of the present invention will be explained below.

Figure 6:
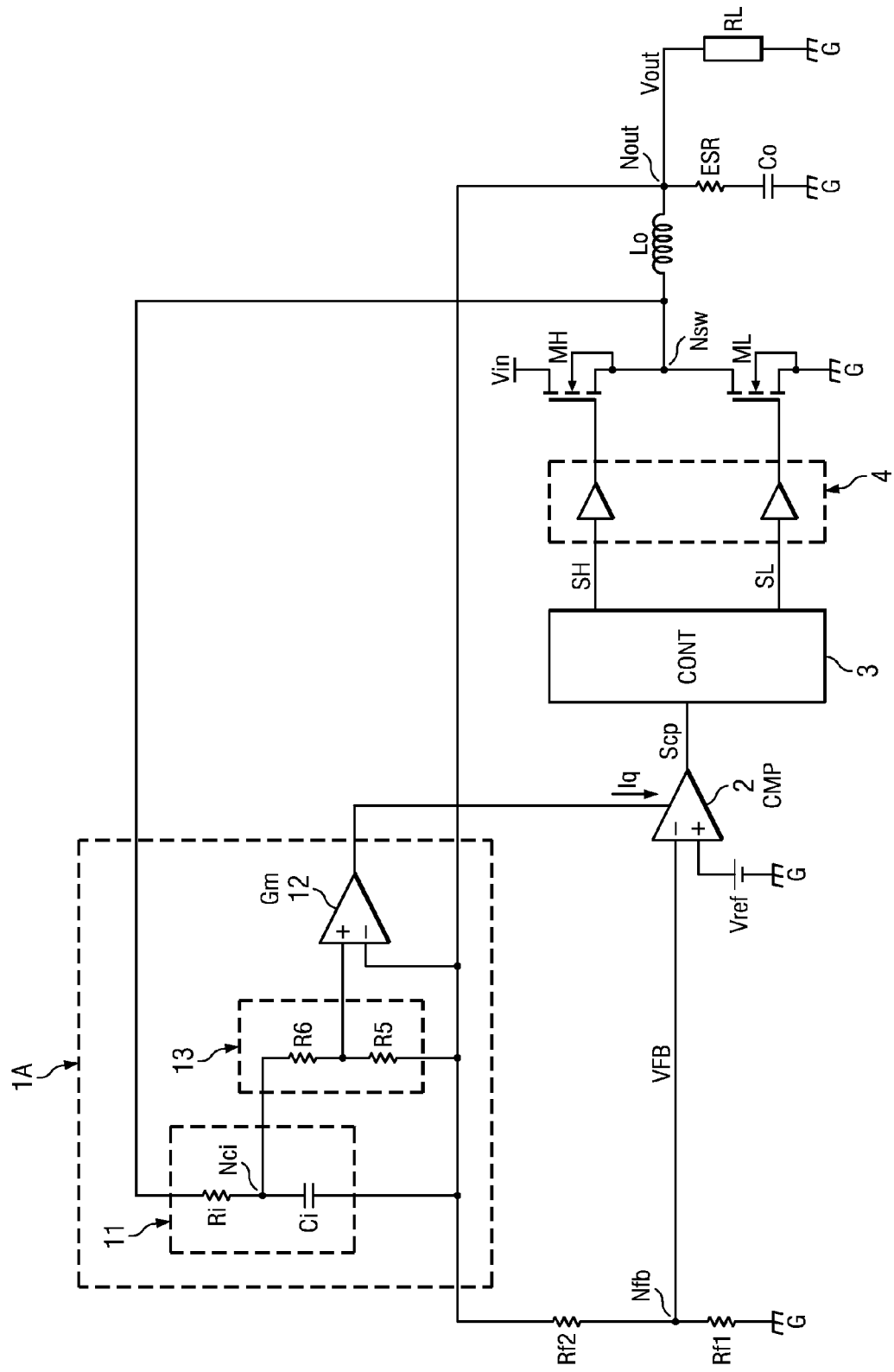
FIG. 6 is a diagram illustrating a constitutional example of the switching power supply device in Embodiment 2.

FIG. 6 is a diagram illustrating a constitutional example of the switching power supply device in Embodiment 2 of the present invention.

For the switching power supply device shown in FIG. 6, ripple signal generator 1 in the switching power supply device shown in FIG. 1 is replaced by ripple signal generator 1A, and the other structural elements are the same as those of the switching power supply device shown in FIG. 1. For ripple signal generator 1A, in addition to the same constitution as that shown in FIG. 1 (CR integrator 11, voltage/current converter 12), there is also voltage division circuit 13 that divides the voltage generated on capacitor Ci. Said voltage division circuit 13 is an embodiment of the voltage division circuit of the present invention. Said voltage division circuit 13 contains resistors R5 and R6 connected in series. One terminal of resistor R6 is connected to node Nci, and the other terminal is connected via resistor R5 to node Nout. Said voltage/current converter 12 converts the voltage obtained by voltage division using voltage divider circuit 13, that is, the voltage between the two terminals of resistor R5, to current Iq.

When the element values of capacitor Ci and resistor Ri are set to appropriate values for enabling integration on a semiconductor chip, it is thought that one may reduce the time constant of CR integrator 11 or increase the amplitude of the ripple voltage generated on capacitor Ci to a level that exceeds the necessary level. When the amplitude is not very large, the input range of voltage/current converter 12 may be insufficient. In the present embodiment, since the amplitude of the ripple voltage generated on capacitor Ci is divided and is input to voltage/current converter 12, it is possible to set the ripple voltage input to voltage/current converter 12 to an appropriate range.

Embodiment 3

In the following, an explanation will be given regarding Embodiment 3 of the present invention.

Figure 7:
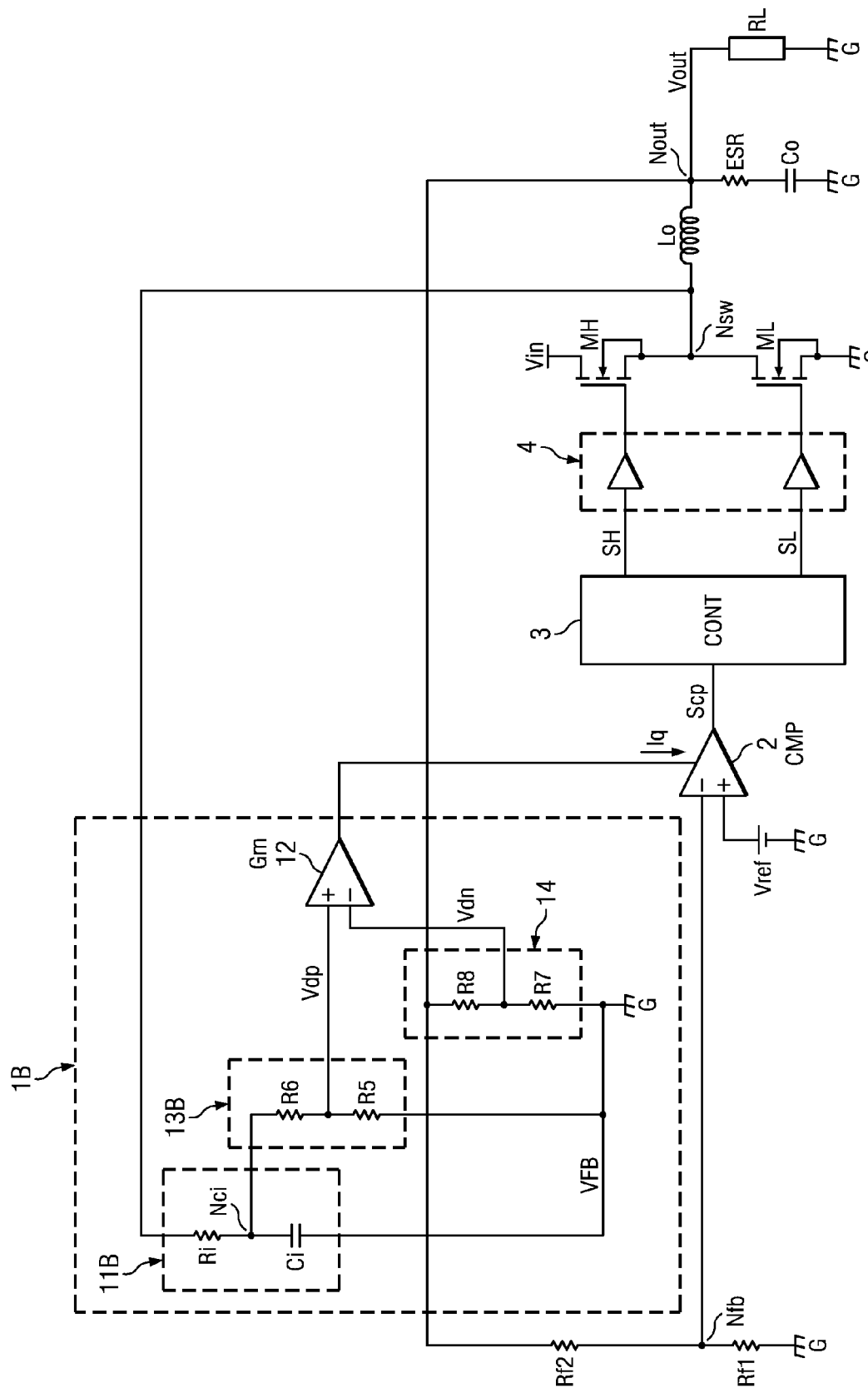
FIG. 7 is a diagram illustrating a constitutional example of the switching power supply device in Embodiment 3.

FIG. 7 is a diagram illustrating a constitutional example of the switching power supply device in Embodiment 3 of the present invention.

For the switching power supply device shown in FIG. 7, ripple signal generator 1 in the switching power supply device shown in FIG. 1 is replaced by ripple signal generator 1B, to be explained below, while the other structural elements are the same as those of the switching power supply device shown in FIG. 1.

Said ripple signal generator 1B has CR integrator 11B, voltage/current converter 12, and voltage divider circuits 13B and 14. Said voltage divider circuit 13B is an embodiment of the first voltage divider circuit of the present invention. Said voltage divider circuit 14 is an embodiment of the first voltage divider circuit of the present invention. Said CR integrator 11B contains resistor Ri and capacitor Ci connected in series, and it is connected in parallel with the series circuit of inductor Lo and capacitor Co. One terminal of resistor Ri is connected to node Nsw, and the other terminal is connected via capacitor Ci to reference potential G. Said voltage divider circuit 13B divides the voltage generated on capacitor Ci. Said voltage divider circuit 13B contains resistors R5 and R6 connected in series. One terminal of resistor R6 is connected to the connection node (node Nci) of resistor Ri and capacitor Ci, and the other terminal is connected via resistor R5 to reference potential G. Said voltage divider circuit 14 divides the voltage generated on capacitor Co with the equivalent voltage division ratio as that of voltage divider circuit 13B. Said voltage divider circuit 14 contains resistors R7 and R8 connected in series. One terminal of resistor R8 is connected to node Nout, and the other terminal is connected via resistor R7 to reference potential G.

Current voltage converting circuit 12 converts the difference between the voltage divided by voltage dividing circuits 13B and 14 into current Iq. In the example shown in FIG. 7, the voltage difference (Vdp−Vdn) between the middle connection node of resistors R5 and R6 and the middle connection node of resistors R7 and R8 is converted into current. Current voltage converting circuit 12, for example, has the configuration shown in FIG. 2.

In the switching power supply device shown in FIG. 7, CR integrator 11B is connected in parallel with the series circuit of inductor Lo and capacitor Co. The voltage applied to CR integrator 11B is compared with the voltage applied to CR integrator 11 (FIG. 1) connected in parallel only with inductor Lo, and it is higher by output voltage Vout of capacitor Co. Consequently, by subtracting output voltage Vout from the voltage generated on capacitor Co of CR integrator 11B, a voltage equivalent to the voltage generated on capacitor Co of CR integrator 11 (FIG. 1) is obtained.

Here, suppose the voltage division ratio of voltage divider circuits 13B, 14 is "γ," voltage Vpn obtained by dividing the voltage on capacitor Co of CR integrator 11B is higher than the voltage obtained by dividing the voltage of CR integrator 11 connected in parallel with inductor Lo (FIG. 6) by voltage division ratio of γ by "γxVout." Consequently, as shown in FIG. 7, the difference (Vdp−dn) between voltage "γxVout" obtained using voltage divider circuit 14 and Vpn obtained using divider circuit 13B is equivalent to the voltage obtained by voltage dividing the voltage of CR integrator 11 with voltage division ratio γ (see FIG. 6).

According to the switching power supply device shown in FIG. 7, like the switching power supply device shown in FIG. 6, the amplitude of the ripple voltage generated on capacitor Ci can be appropriately reduced to match the input range of voltage/current converter 12.

Also, for the switching power supply device shown in FIG. 7, the input in-phase voltage of voltage/current converter 12 is about voltage "γxVout" and is lower than input in-phase voltage "Vout" of voltage/current converter 12 in the switching power supply device shown in FIG. 6. As a result, the power supply voltage for operation of voltage/current converter 12 may be lower than "Vout," and this is favorable for integrating the lower-voltage IC at present.

Embodiment 4

In the following, an explanation will be given regarding Embodiment 4.

Figure 8:
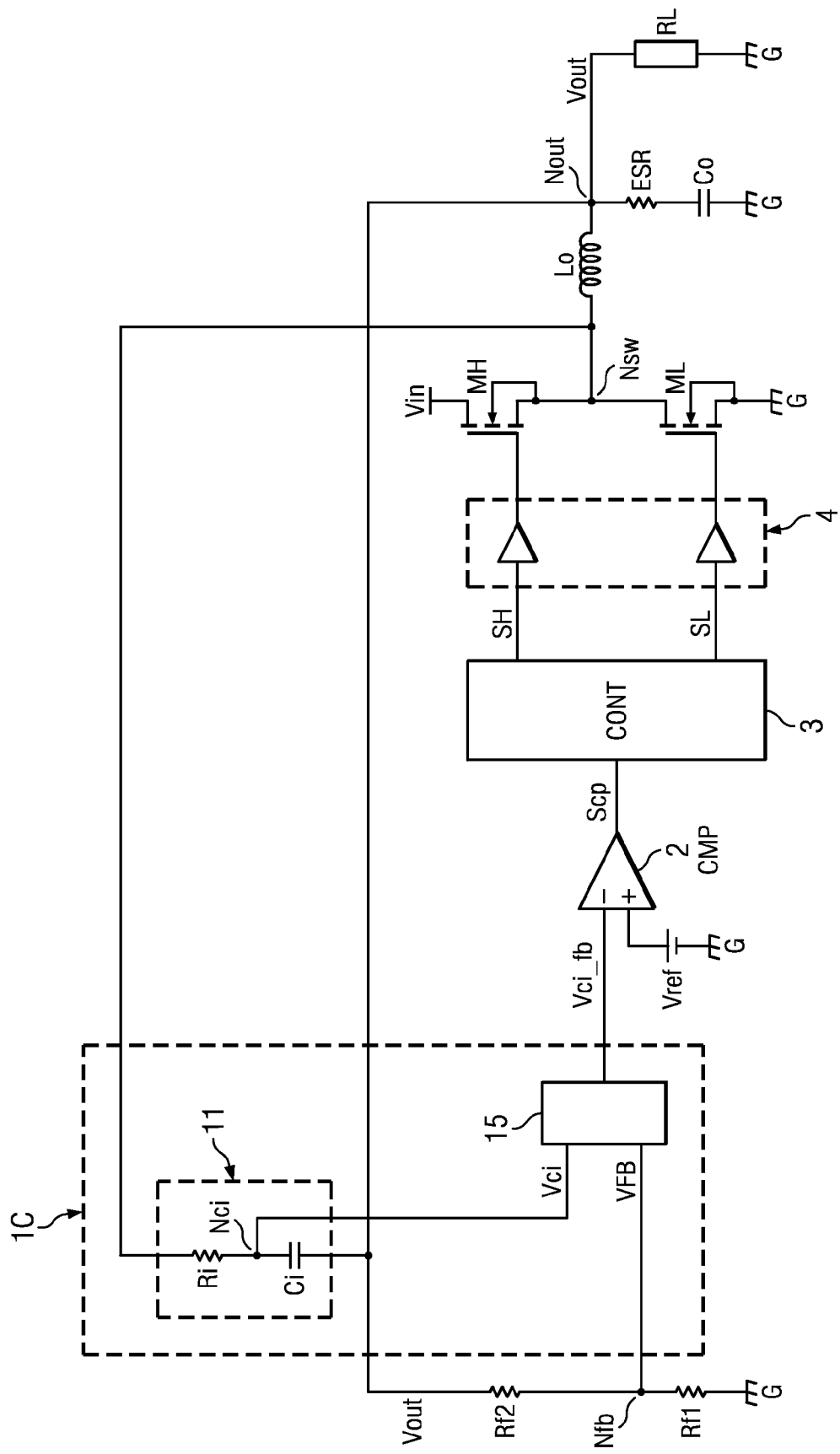
FIG. 8 is a diagram illustrating a constitutional example of the switching power supply device in Embodiment 4.

FIG. 8 is a diagram illustrating a constitutional example of the switching power supply device in Embodiment 4 of the present invention.

In the switching power supply device shown in FIG. 8, ripple signal generator 1 used in the switching power supply device shown in FIG. 1 is replaced by ripple signal generator 1C, and its other structural elements are the same as those in the switching power supply device shown in FIG. 1.

Said ripple signal generator 1C has CR integrator 11, like that in ripple signal generator 1, and, at the same time, it has signal synthesizer 15 that outputs synthetic signal Vci_fb as a synthesis of the ripple voltage generated on capacitor Ci and output feedback voltage VFB. Said signal synthesizer 15 is an embodiment of the first signal synthesizer of the present invention.

Figure 9:
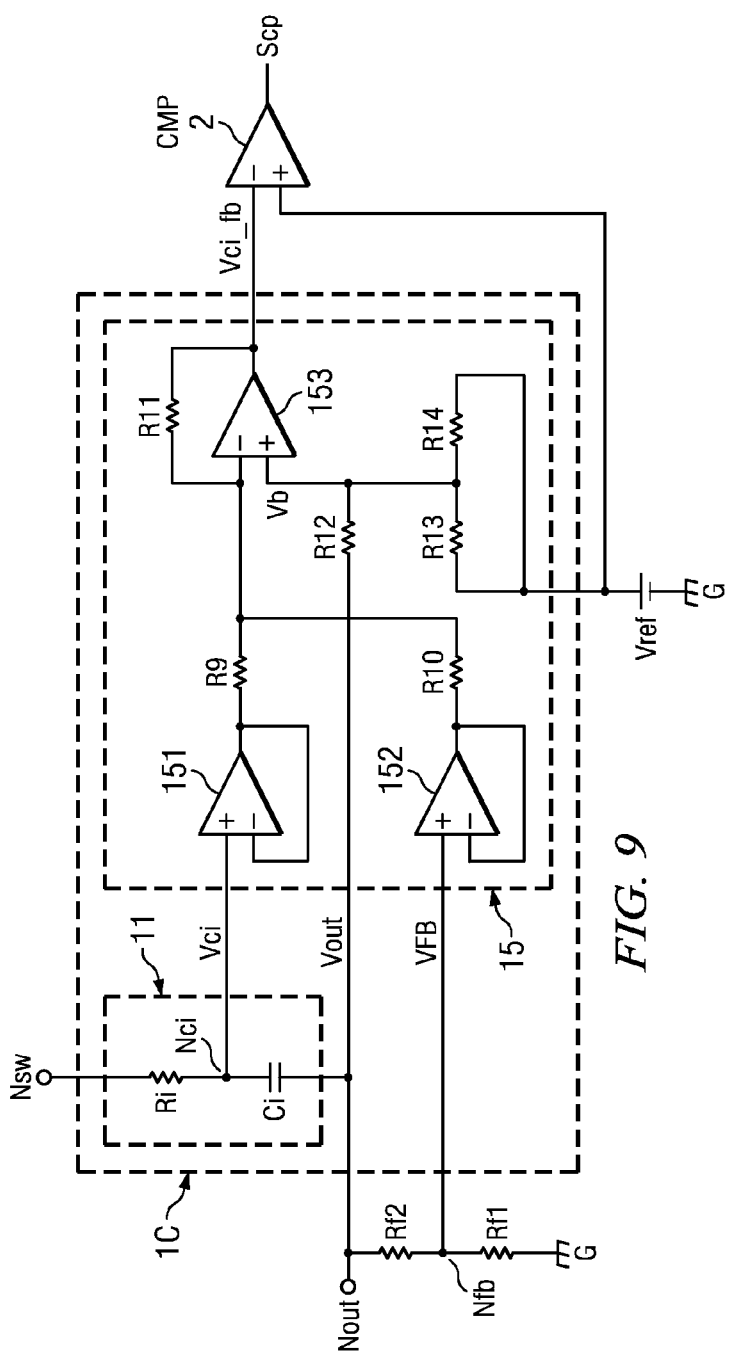
FIG. 9 is a diagram illustrating a constitutional example of the ripple signal generator in the switching power supply device shown in FIG. 8.

FIG. 9 is a diagram illustrating a constitutional example of said ripple signal generator 1C.

Said ripple signal generator 1C shown in FIG. 9 has amplifiers 151-153 and resistors R9-R14.

The non-inverting input terminal of amplifier 151 is connected to node Nci. Its output terminal is connected to the inverting input terminal. The non-inverting input terminal of amplifier 152 is connected to node Nfb. The output terminal is connected to the inverting input terminal. The inverting input terminal of amplifier 153 is connected to the output terminal of amplifier 151 via resistor R9 and to the output terminal of amplifier 152 via resistor R10. The output terminal of amplifier 153 is connected to its inverting input terminal via resistor R11. The non-inverting input terminal of amplifier 153 is connected to node Nout and via resistor R12 to reference voltage Vref via the parallel circuit of resistors R13 and R14. In amplifier 153, synthetic signal Vci_fb is output.

Said comparator 2 compares synthetic signal Vci_fb with reference voltage Vref, and signal Scp corresponding to the comparison result is generated.

In signal synthesizer 15 shown in FIG. 9, amplifiers 151 and 152 form a buffer circuit, and voltage Vci and voltage VFB input with a high impedance are output with a low impedance. Also, resistors R9-R11 and amplifier 153 form an inverter/amplifier. After voltages Vci, VFB, respectively input from amplifiers 151 and 152, are multiplied by prescribed gains, they are added. The gain of the inverter/amplifier is negative, and the phase of each input signal is inverted by the inverter/amplifier.

Synthetic voltage Vb synthesized from output voltage Vout and reference voltage Vref at a prescribed ratio is input to the non-inverting input terminal of amplifier 153. For example, synthetic voltage Vb may be represented by the following formula.

(Mathematical Formula 5)

$$Vb = \alpha \cdot Vout + \beta \cdot Vref \quad (5)$$

The component of output voltage Vout in synthetic voltage Vb (α·Vout) is generated in proportion to voltage (Vci−Vout)

of capacitor Ci, together with the component of voltage Vci input to amplifier 151. Here, proportion α is set so that a component proportional to voltage (Vci−Vout) of capacitor Ci is generated in synthetic signal Vci_fb.

On the other hand, the component of reference voltage Vref in synthetic voltage Vb (β·Vref) generates a DC offset component in synthetic signal Vci_fb. Here, proportion β is set such that synthetic signal Vci_fb is equal to reference voltage Vref when output voltage Vout instead of voltage Vci is input to amplifier 151 (that is, the voltage of capacitor Ci is set to zero) instead of voltage Vci in amplifier 151, and reference voltage Vref is input instead of output feedback voltage VFB in amplifier 152.

Figure 10:
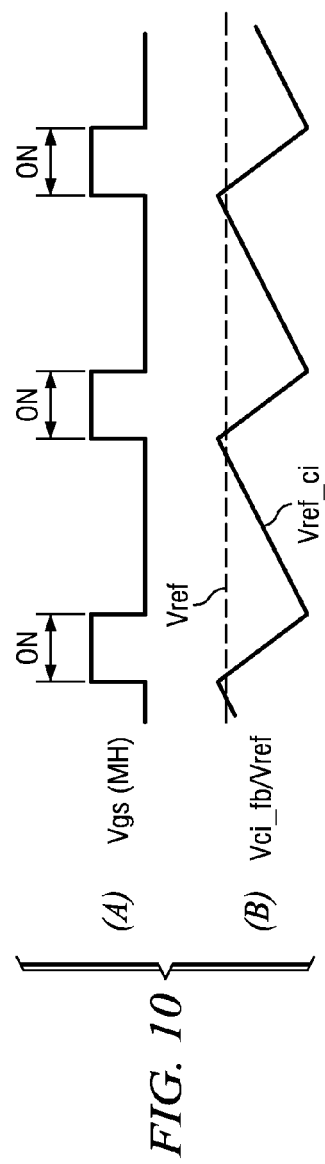
FIG. 10 is a diagram illustrating the relationship between the synthetic signal and the reference voltage in the switching power supply device shown in FIG. 8.

Here, the steady-state operation of the switching power supply device shown in FIG. 8 will be explained with reference to FIG. 10. FIG. 10 is a diagram illustrating an example of the relationship between synthetic signal Vci_fb and reference voltage Vref.

The phase of the component of output feedback voltage VFB and the phase of component of the voltage (Vci−Vout) of capacitor Ci contained in synthetic signal Vci_fb are both inverted. That is, as output feedback voltage VFB and voltage (Vci−Vout) of capacitor Ci rise, the level of synthetic signal Vci_fb falls, and conversely, as said voltages fall, the level of synthetic signal Vci_fb rises.

On the other hand, in the present embodiment, as signal Scp indicating that synthetic signal Vci_fb is larger than reference voltage Vref is input from comparator 2, MOS transistor MH is turned on for a prescribed time (FIG. 10(A)). As MOS transistor MH is turned on, the current flowing through inductor Lo rises, and, correspondingly, voltage (Vci−Vout) of capacitor Ci increases. Consequently, synthetic signal Vci_fb decreases (FIG. 10(B)). When controller 3 turns off said MOS transistor MH after said prescribed time (FIG. 10(A)), the current flowing through inductor Lo decreases, and voltage (Vci−Vout) of capacitor Ci also decreases. Consequently, synthetic signal Vci_fb rises (FIG. 10(B)). Consequently, at steady state, as shown in FIG. 10(B), the peak of synthetic signal Vci_fb and reference voltage Vref become approximately equal.

In signal synthesizer 15 shown in FIG. 9, the DC offset of synthetic signal Vci_fb is set such that synthetic signal Vci_fb and reference voltage Vref are equal when the voltage of capacitor Ci is set to zero, and, instead of output feedback voltage VFB, reference voltage Vref is input. Consequently, when the peak of synthetic signal Vci_fb and reference voltage Vref are approximately equal (FIG. 10(B)), the small ripple voltage of capacitor Ci can be ignored, and output feedback voltage VFB approaches reference voltage Vref. That is, output voltage Vout at steady state is approximately equal to the target voltage defined by reference voltage Vref and the voltage division ratio of resistors Rf1, Rf2.

For the switching power supply device shown in FIG. 8, the gain of voltage (Vci−Vout) in signal synthesizer 15 can be set at will. As a result, even if the time constant of CR integrator 11 is small and the voltage amplitude of capacitor Ci is large, it is still possible to perform conversion so that the amplitude of the voltage component of capacitor Ci contained in synthetic signal Vci_fb becomes appropriately smaller. Consequently, even in the switching power supply device shown in FIG. 8, it is still possible to integrate CR integrator 11 in a semiconductor chip, and the same effect as the switching power supply device shown in FIG. 1 can be displayed.

Embodiment 5

In the following, an explanation will be given regarding Embodiment 5 in the present invention.

Figure 11:
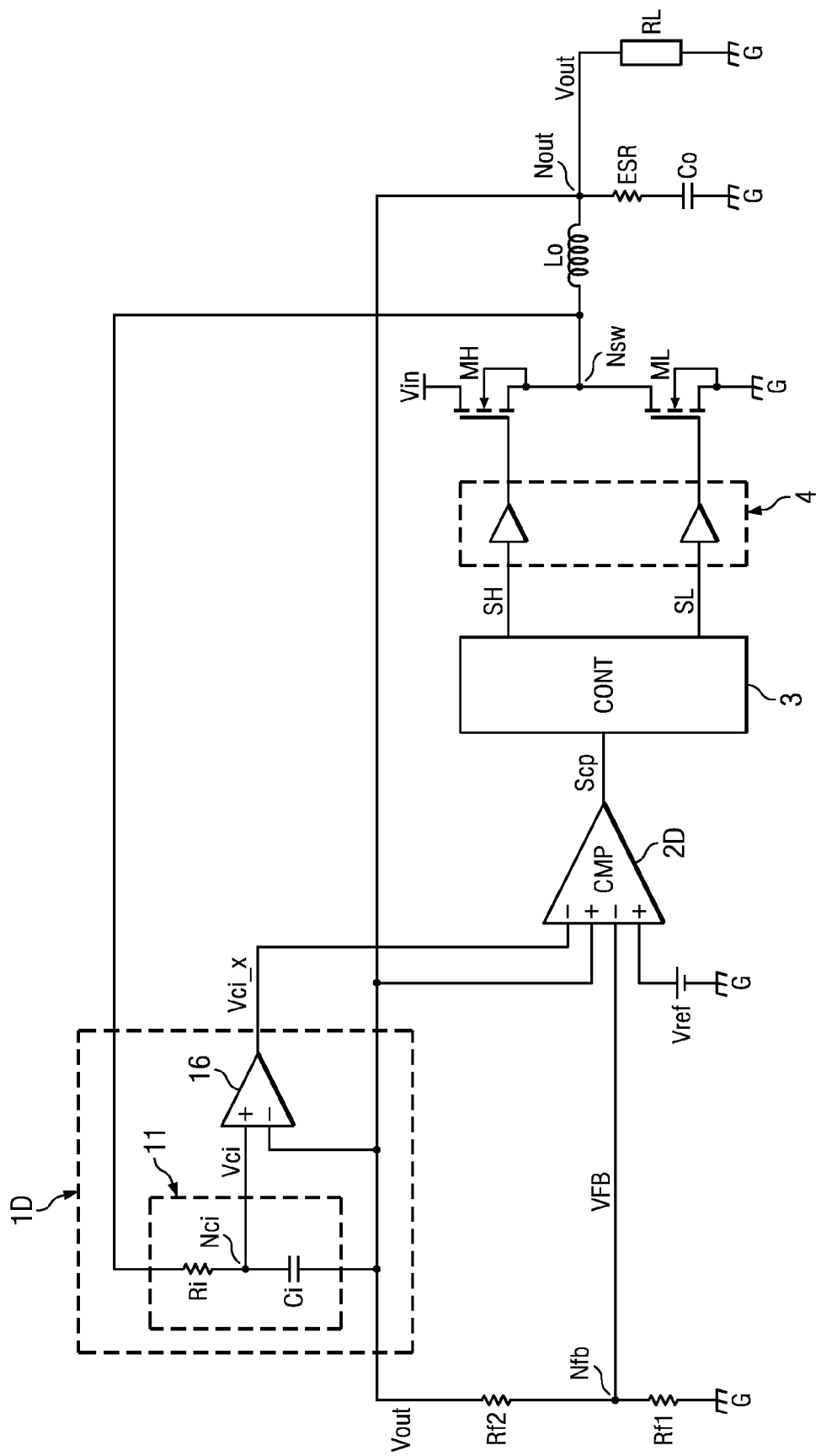
FIG. 11 is a diagram illustrating a constitutional example of the switching power supply device in Embodiment 5.

FIG. 11 is a diagram illustrating a constitutional example of the switching power supply device in Embodiment 5. In the switching power supply device shown in FIG. 11, ripple signal generator 1 used in the switching power supply device shown in FIG. 1 is replaced by ripple signal generator 1D, and comparator 2 is replaced by comparator 2D, while the other structural elements are the same as those in the switching power supply device shown in FIG. 1.

Said ripple signal generator 1D has CR integrator 11, the same as ripple signal generator 1, as well as amplitude converter 16 that converts the voltage amplitude of capacitor Ci. Said amplitude converter 16 generates ripple signal Vci_X similar to the ripple voltage generated on capacitor Ci and with a smaller amplitude than that of the ripple voltage. In the example shown in FIG. 11, ripple signal Vci_X is a signal that uses output voltage Vout as reference. Said comparator 2D amplifies the difference between output feedback voltage VFB and reference voltage Vref, and, at the same time, it amplifies ripple signal Vci_X. It then synthesizes said results of amplification, and the result is further amplified to generate logic signal Scp.

Figure 12:
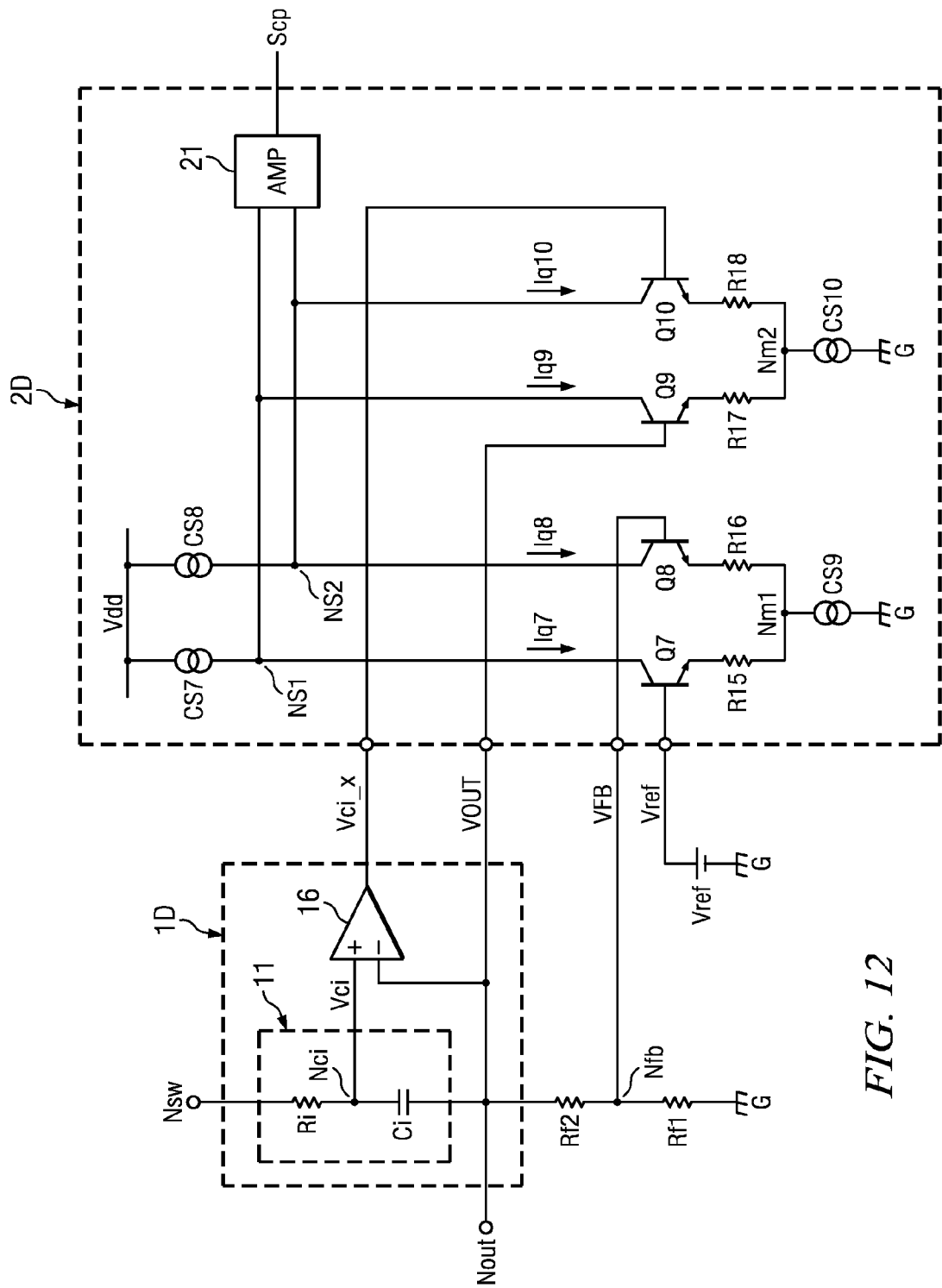
FIG. 12 is a diagram illustrating a constitutional example of the converter in the switching power supply device shown in FIG. 11.

FIG. 12 is a diagram illustrating a constitutional example of comparator 2D.

Said comparator 2D shown in FIG. 12 has npn transistors Q7-Q10, current sources CS7-CS10, resistors R15-R18, and output amplifier 21. The circuit containing npn transistors Q7, Q8, resistors R15, R16 and current source CS10 is an embodiment of the second amplifier section of the present invention. The circuit containing npn transistors Q9, Q10, resistors R17, R18 and current source CS10 is an embodiment of the second amplifier section of the present invention. Current source CS7 is an embodiment of the first load circuit of the present invention. Current source CS8 is an embodiment of the second load circuit of the present invention. Said output amplifier 21 is an embodiment of the third amplifier section of the present invention.

The emitter of npn transistor Q7 is connected via resistor R15 to node Nm1. Its collector is connected to current synthesis node NS1 (first current synthesis node), and reference voltage Vref is input to its base. The emitter of npn transistor Q8 is connected via resistor R16 to node Nm1. Its base is connected to node Nfb. Current source CS9 is connected between node Nm1 and reference potential G. The emitter of npn transistor Q9 is connected via resistor R17 to node Nm2. Its collector is connected to current synthesis node NS1, and its base is connected to node Nout. The emitter of npn transistor Q10 is connected via resistor R18 to node Nm2. Its collector is connected to current synthesis node NS2, and ripple signal Vci_X input is to its base. Said current source CS10 is connected between node Nm2 and reference potential G.

Said current source CS7 is connected between current synthesis node NS1 and power supply line Vdd, and current source CS8 is connected between current synthesis node NS2 and power supply line Vdd. Said npn transistors Q7, Q8, resistors R15, R16 and current source CS9 form a differential amplifier that converts the differential voltage into a differential current. Corresponding to the difference between output feedback voltage VFB and reference voltage Vref, the difference between collector currents (Iq8−Iq7) of npn transistors Q7, Q8 is generated.

Also, npn transistors Q9, Q10, resistors R17, R18 and current source CS10 form a differential amplifier that converts the differential voltage into a differential current. Corresponding to the difference between ripple signal Vci_X and output voltage Vout (that is, the voltage on capacitor Ci), the difference between collector currents of npn transistors Q9 and Q10 (Iq10−Iq9) is generated.

Here, current Iq7 and current Iq9 are synthesized at current synthesis node NS1, and the synthesized current flows to current source CS7, and current Iq8 and current Iq10 are synthesized at current synthesis node NS2, and the current flows to current source CS8.

Consequently, the voltage difference generated at current source CS7 and CS8 (that is, the difference between voltages at current synthesis nodes NS1 and NS2) is the result of synthesis of the component generated due to differential current (Iq8−Iq7) and the component generated due to differential current (Iq10−Iq9). For example, when output feedback voltage VFB rises with respect to reference voltage Vref and when ripple signal Vci_X rises with respect to output voltage Vout, current (Iq8+Iq10) of current synthesis node NS2 increases, so that the voltage at current synthesis node NS2 falls with respect to the voltage at current synthesis node NS1. On the other hand, when output feedback voltage VFB falls with respect to reference voltage Vref, or when ripple signal Vci_X decreases with respect to output voltage Vout, the current at current synthesis node NS2 (Iq8+Iq10) decreases, the voltage at current synthesis node NS2 rises with respect to the voltage at current synthesis node NS1.

The voltages at current synthesis nodes NS1 and NS2 are further amplified by output amplifier 21, so that logic signal Scp which has a high level or low level is generated.

As explained above, for the switching power supply device shown in FIG. 11, ripple signal Vci_X is synthesized with respect to the signal obtained by amplifying the result of synthesis of ripple signal Vci_X with respect to the signal obtained by amplifying the difference between output feedback voltage VFB and reference voltage Vref, and the synthesis result is further amplified, so that logic signal Scp of comparator 2D is generated. Consequently, in the stage when the difference between output feedback voltage VFB and reference voltage Vref is large, logic signal Scp becomes constant at the high level or the low level, and the difference between output feedback voltage VFB and reference voltage Vref becomes much smaller. As a result, logic signal Scp is switched to the low level or high level to indicate the peak or trough of ripple signal Vci_X.

Consequently, in the switching power supply device shown in FIG. 11, the operation of the ripple control system may also be performed.

For the switching power supply device shown in FIG. 11, it is possible to convert the voltage amplitude of capacitor Ci in amplitude converter 16 at will, so that it is possible to have CR integrator 11 integrated to the semiconductor chip. The same effect as that of the switching power supply device shown in FIG. 1 can be displayed.

Embodiment 6

In the following, an explanation will be given regarding Embodiment 6 of the present invention.

Figure 13:
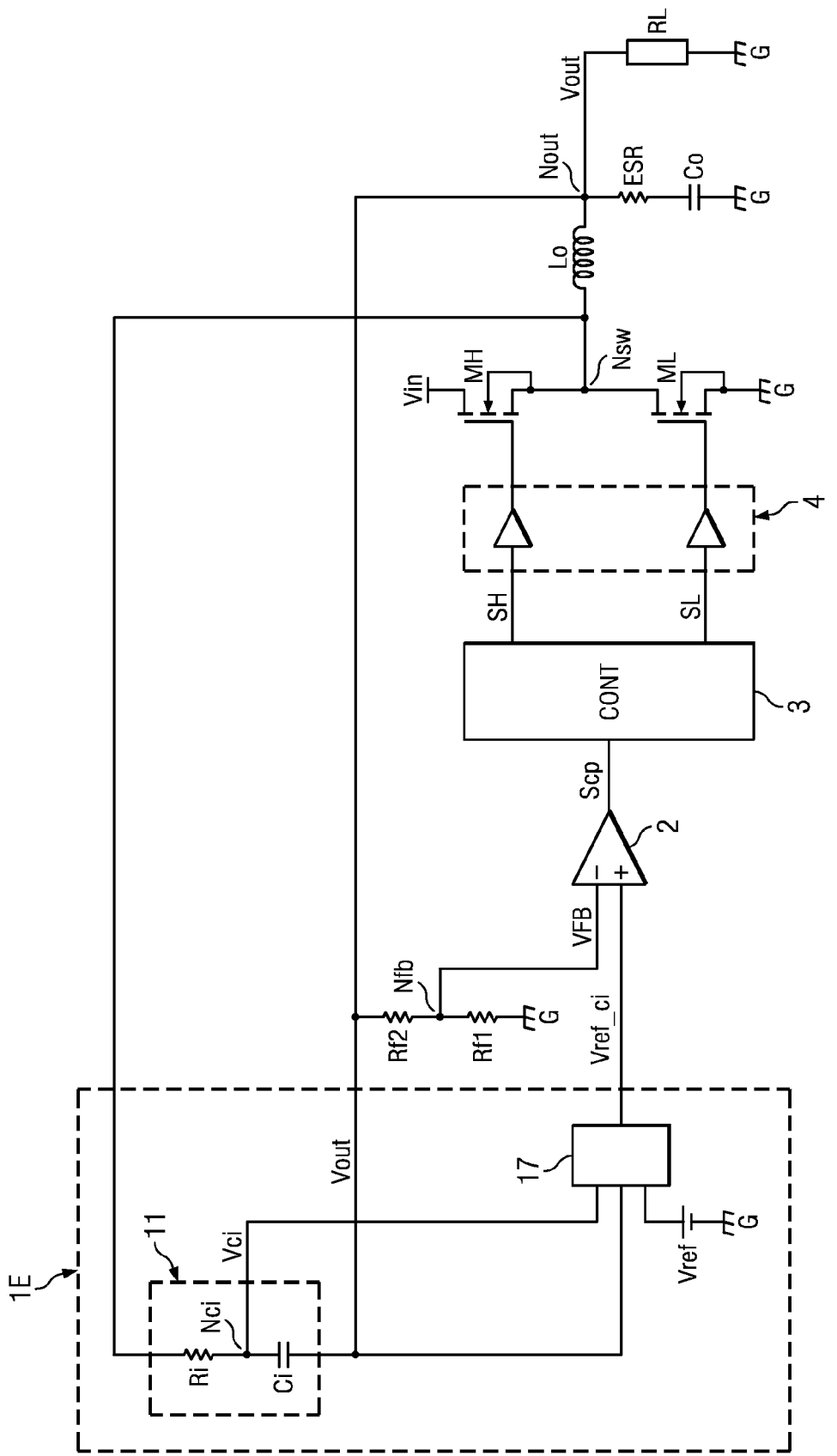
FIG. 13 is a diagram illustrating a constitutional example of the switching power supply device in Embodiment 6.

FIG. 13 is a diagram illustrating a constitutional example of the switching power supply device in Embodiment 6. In the switching power supply device shown in FIG. 13, ripple signal generator 1 in the switching power supply device shown in FIG. 1 is replaced by ripple signal generator 1E, and the other structural elements are the same as those in the switching power supply device shown in FIG. 1.

CR integrator 11 of said ripple signal generator 1E is the same as ripple signal generator 1, as is signal synthesizer 17 that outputs ripple signal Vref_ci as a synthesis signal of the ripple voltage generated on capacitor Ci and reference voltage Vref.

Said signal synthesizer 17 is an embodiment of the second signal synthesizer in the present invention.

Figure 14:
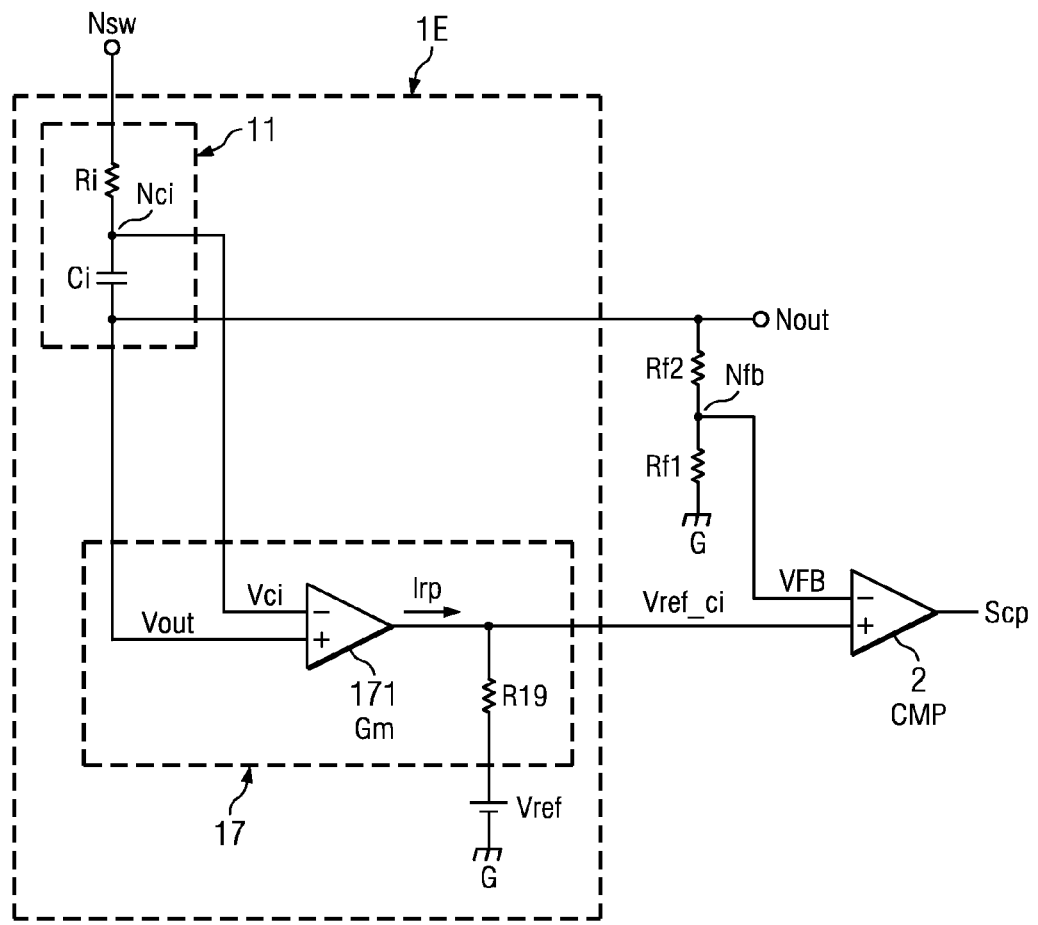
FIG. 14 is a diagram illustrating a constitutional example of the ripple signal generator in the switching power supply device in Embodiment 6.

FIG. 14 is a diagram illustrating a constitutional example of ripple signal generator 1E.

Said ripple signal generator 1E shown in FIG. 14 has voltage/current converter 171 and resistor R19.

Said voltage/current converter 171 converts voltage (Vci−Vout) generated on capacitor Ci to current Irp. When voltage Vci is lower than output voltage Vout, a positive current (ejecting current) is generated, and, when voltage Vci is higher than output voltage Vout, a negative current (sink current) is generated. For example, voltage/current converter 171 has the same constitution as that of voltage/current converter 12 shown in FIG. 2.

One terminal of resistor R19 is connected to the current output terminal of voltage/current converter 171, and reference voltage Vref is applied to the other terminal. Synthetic signal VRef_ci is generated at the connection node between the current output terminal of voltage/current converter 171 and resistor R19.

Said comparator 2 generates logic signal Scp corresponding to the result of comparison between synthetic signal Vref_ci and output feedback voltage VFB.

Figure 15:
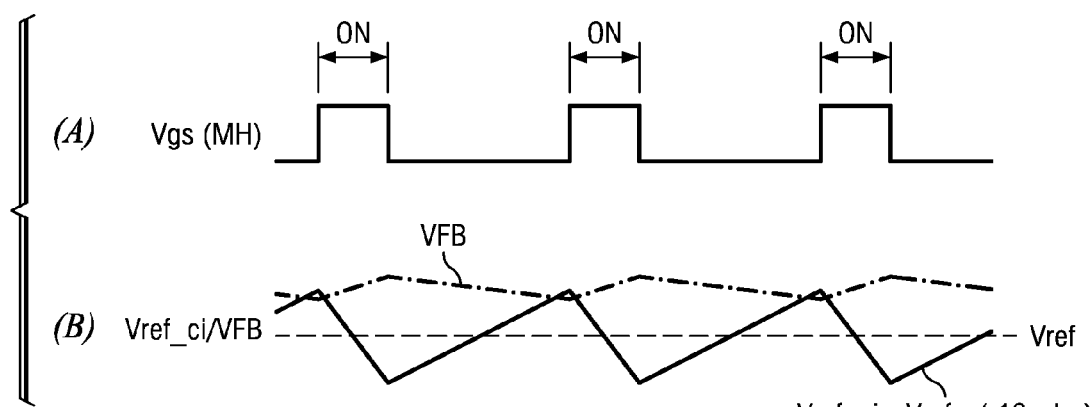
FIG. 15 is a diagram illustrating the relationship between the synthetic signal and the output feedback voltage in the switching power supply device shown in FIG. 13.

In the following, the steady-state operation of the switching power supply device shown in FIG. 13 will be explained with reference to FIG. 15. FIG. 15 is a diagram illustrating an example of the relationship between synthetic signal Vref_ci and output feedback voltage VFB.

When the input impedance of comparator 2 is sufficiently high, most of the current output from voltage/current converter 171 flows to resistor R19. Consequently, if the resistance of resistor R19 is "r19," synthetic signal Vref_ci can be represented by the following formula.

(Mathematical Formula 6)

$$Vci\_fb = r19 \times Irp + Vref \quad (6)$$

Said controller 3 executes control so that MOS transistor MH is turned on for a prescribed time corresponding to signal Scp of comparator 2, which indicates that said synthetic signal Vref_ci is higher than output feedback voltage VFB. When MOS transistor MH is turned on, the current through inductor Lo increases, and the voltage of capacitor Ci rises. Current Irp is positive when "Vci<Vout," and it is negative when "Vci>Vout." Consequently, when the voltage of capacitor Ci rises, synthetic signal Vci_fb falls. After a prescribed time, under control of controller 3, MOS transistor MH is turned off, so that the current in inductor Lo decreases, and the voltage on capacitor Ci falls. As a result, synthetic signal Vci_fb rises. Then, when synthetic signal Vref_ci exceeds output feedback voltage VFB, MOS transistor MH is turned on again. In this way, as shown in FIG. 15(B), output feedback voltage VFB becomes approximately equal to the peak of synthetic signal Vref_ci.

As explained above, with the switching power supply device shown in FIG. 13, by adjusting the mutual conductance of voltage/current converter 171 and the resistance of resistor R19, etc., it is possible to set the gain of voltage (Vci−Vout) in signal synthesizer 17 at will. Consequently, even when the time constant of CR integrator 11 is small and the voltage amplitude of capacitor Ci is large, it is still possible to appropriately reduce the amplitude of the voltage component of capacitor Ci contained in synthetic signal Vci_fb. Consequently, even in the switching power supply device shown in FIG. 13, it is possible to integrate CR integrator 11 into the semiconductor chip, and the same effect as that of the switching power supply device shown in FIG. 1 can also be realized.

Figure 16:
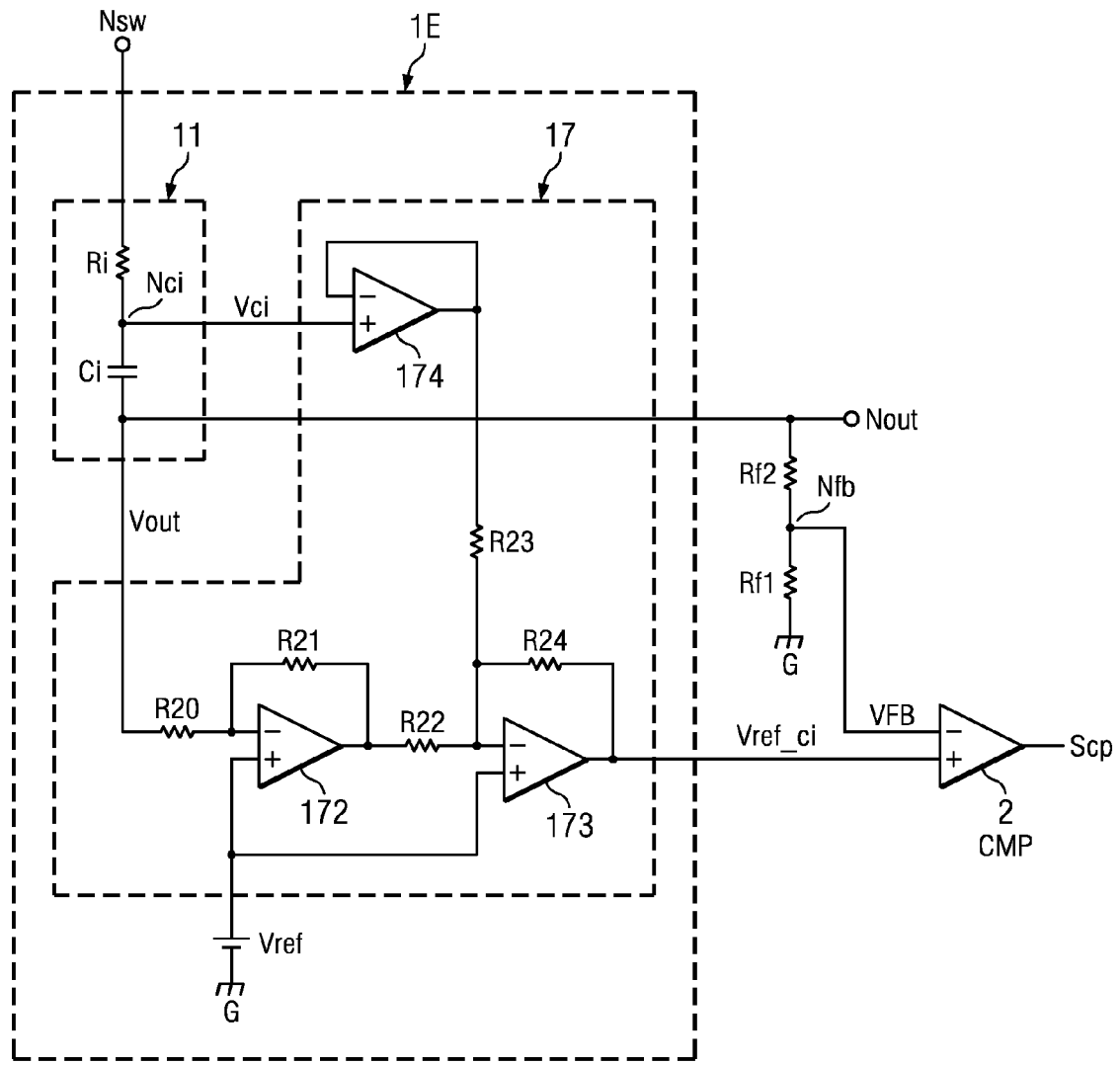
FIG. 16 is a diagram illustrating another example of the ripple signal generator in the switching power supply device shown in FIG. 13.
Figure 17:
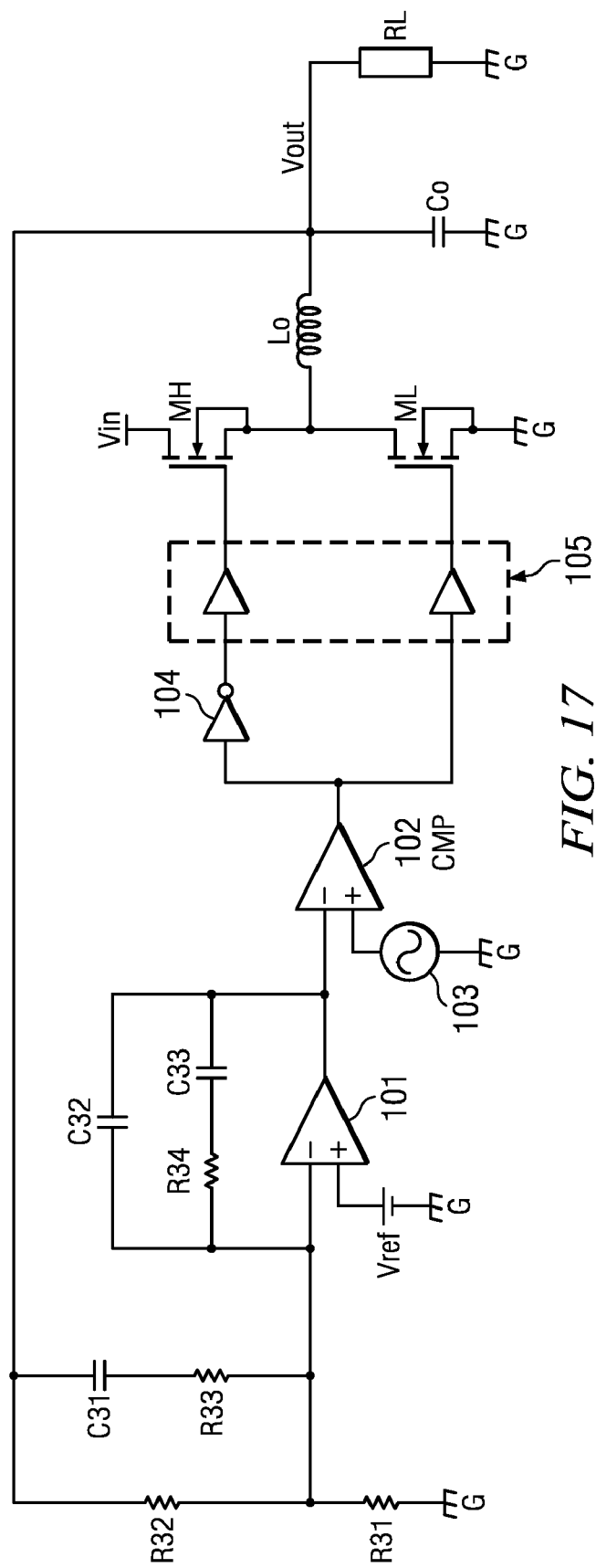
FIG. 17 is a diagram illustrating a constitutional example of the switching power supply device in the voltage mode system of the prior art.
Figure 18:
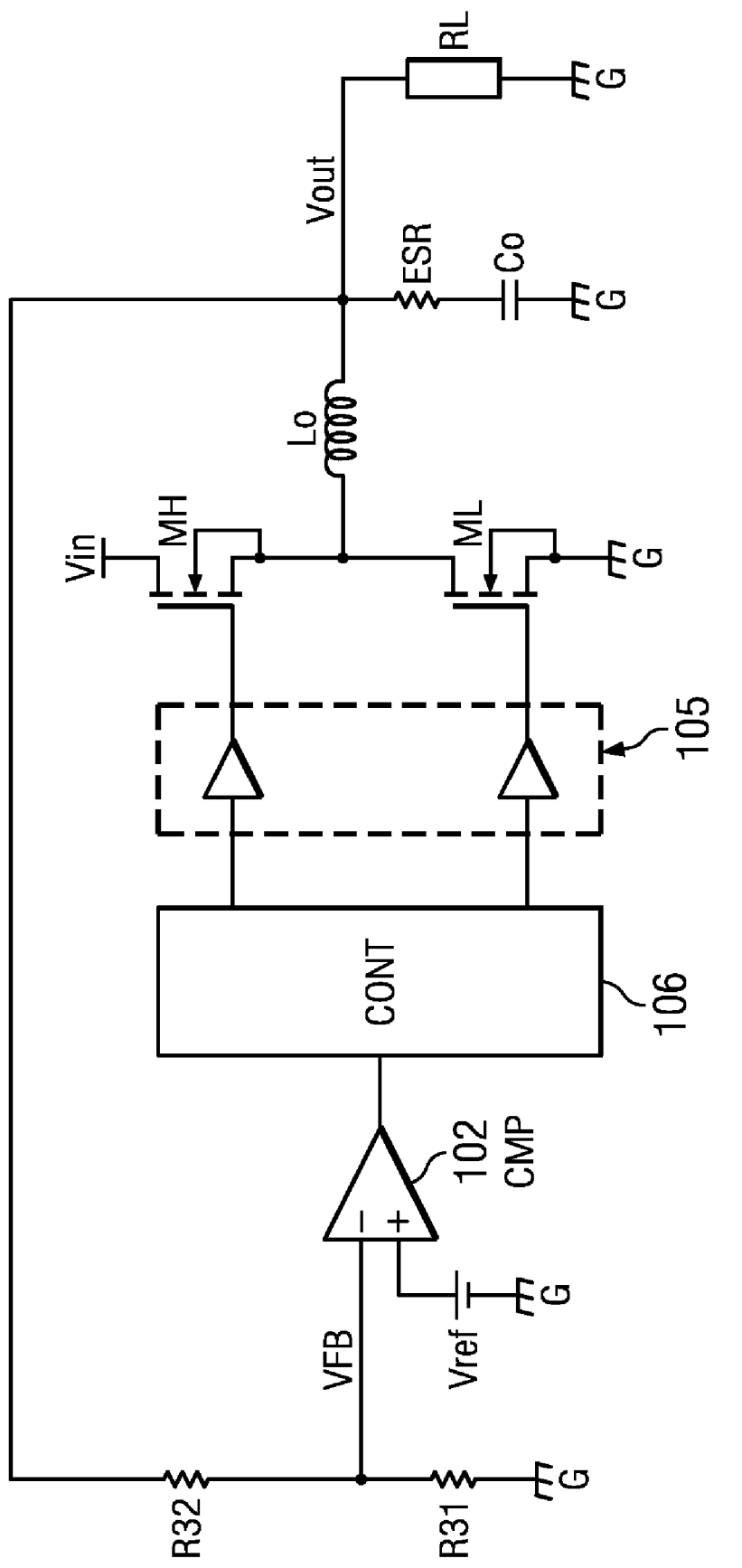
FIG. 18 is a diagram illustrating a constitutional example of the switching power supply device of the ripple control system of the prior art.
Figure 19:
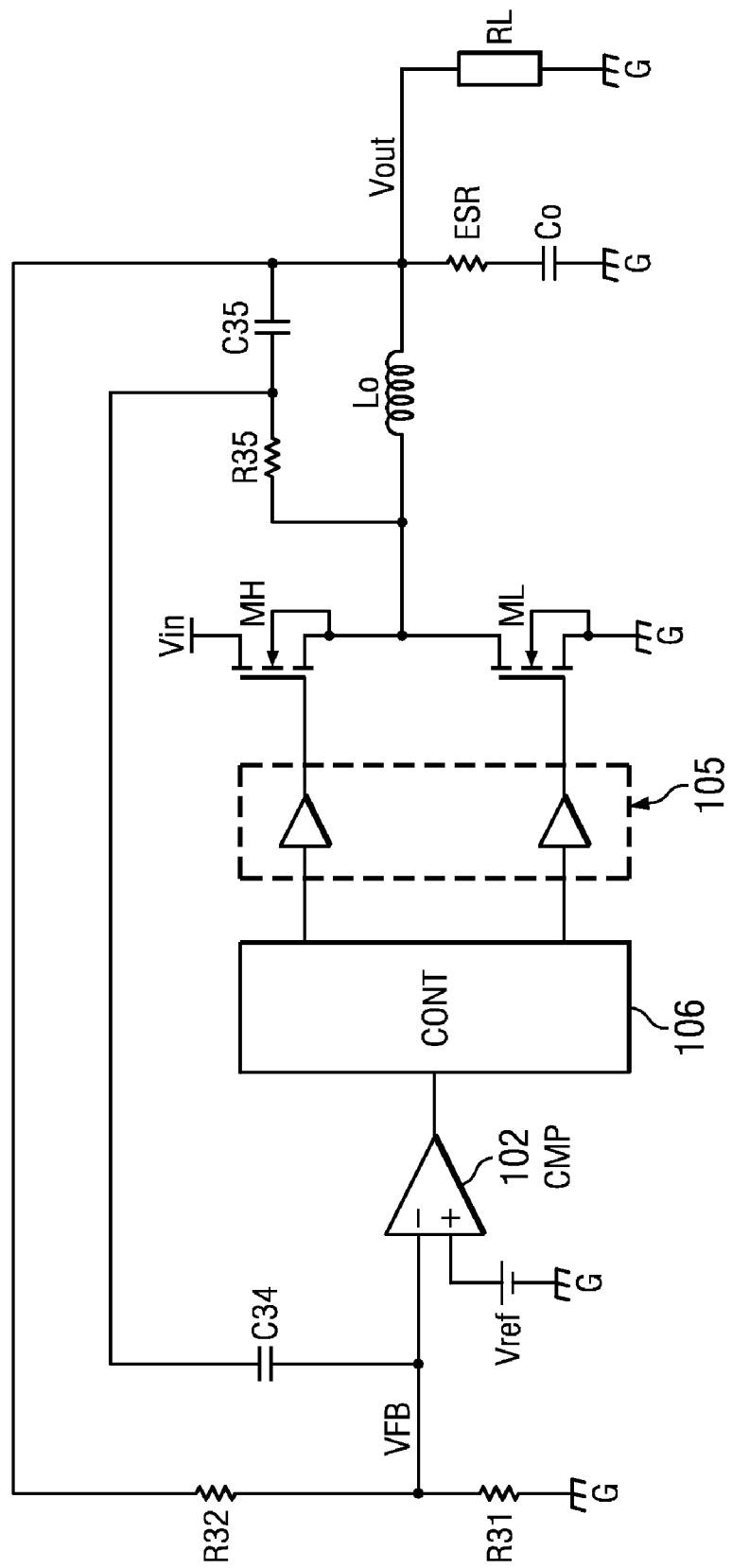
FIG. 19 is a diagram illustrating a constitutional example of the switching power supply device of the ripple control system using the ripple signal retrieved by means of the CR integrator.
Figure 20:
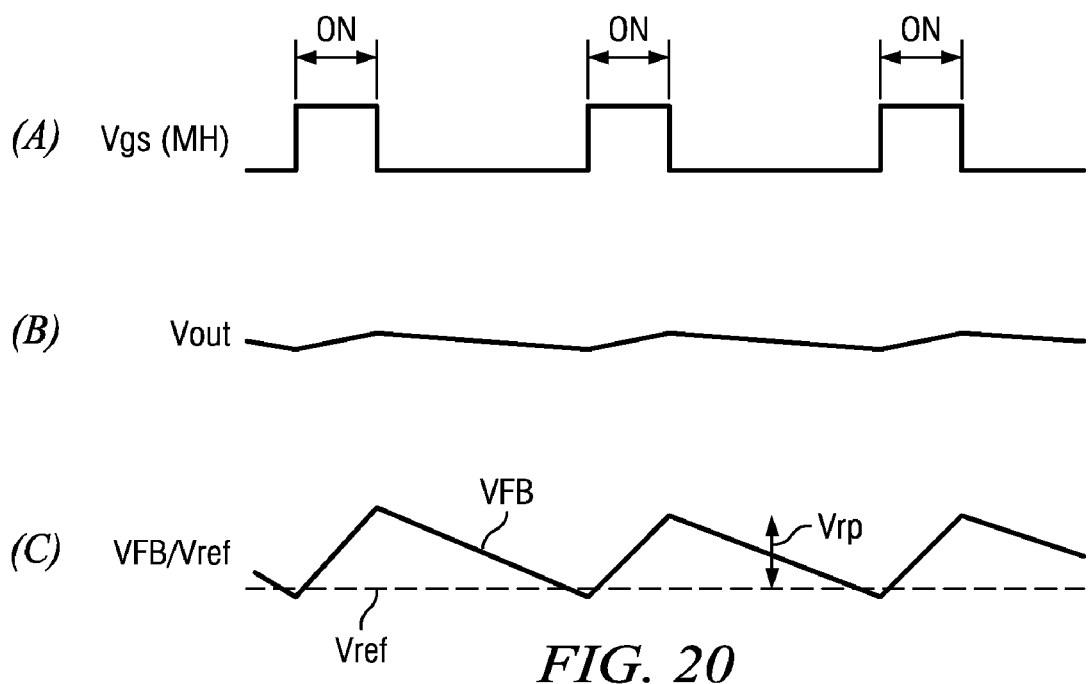
FIG. 20 is a diagram illustrating an example of the signal waveforms at the various portions in the switching power supply device shown in FIG. 19.

FIG. 16 is a diagram illustrating another constitutional example of ripple signal generator 1E.

As shown in FIG. 16, ripple signal generator 1E contains amplifiers 172-174 and resistors R20-R24.

The inverting input terminal of amplifier 172 is connected via resistor R20 to node Nout. The output terminal of amplifier 172 is connected via resistor R21 to its inverting input terminal. The non-inverting input terminal of amplifier 174 is connected to node Nci. The inverting input terminal of amplifier 174 is connected to its output terminal. The inverting input terminal of amplifier 173 is connected via resistor R22 to the output terminal of amplifier 172, and, at the same time, it is connected via resistor R23 to the output terminal of amplifier 174. The output terminal of amplifier 173 is connected via resistor R24 to its inverting input terminal. Reference voltage Vref is applied to the non-inverting input terminals of amplifiers 172, 173.

Amplifier 174 forms a buffer circuit to which voltage Vci at node Nci is input at high impedance, and it has approximately the same voltage output at low impedance. Said amplifier 172 and resistors R20, R21 form an inverter/amplifier that inverts and amplifies the phase of output voltage Vout at a prescribed gain.

Also, amplifier 173 and resistors R22-R24 form an inverter/amplifier, which inverts the phase and amplifies at prescribed gains the output voltage of the inverter/amplifier (172, R20, R21) of the preceding section and output voltage Vci of buffer circuit 174, respectively, followed by adding them. By selecting appropriate gains for the respective inverter/amplifier circuits, it is possible to generate synthetic signal Vci_fb output from amplifier 173 proportional to voltage (Vci−Vout) of capacitor Ci. Also, because both inverter/amplifier circuits amplify with reference to reference voltage Vref, when voltage (Vci−Vout) of capacitor Ci is zero, synthetic signal Vci_fb becomes equal to reference voltage Vref. Consequently, even in the circuit constitution shown in FIG. 16, it is still possible to generate synthetic signal Vci_fb identical to that of ripple signal generator 1E shown in FIG. 14.

Several embodiments of the present invention were explained above. However, the present invention is not limited to the aforementioned embodiments. Various variations are also included in it.

Said embodiment was explained for the case when the following system is adopted: at the bottom or peak of the ripple current flowing through inductor Lo, MOS transistor MH is turned on for a prescribed time. As a result, the current in inductor Lo is increased (fixed on-time system). However, the present invention is not limited to this. For example, one may also adopt a system in which MOS transistor MH is turned off for a prescribed time at the bottom or peak of the ripple current flowing through inductor Lo, so that the current in inductor Lo is decreased (fixed off-time system). Also, according to the present invention, one may adopt a system in which said on-/off-time is changed adaptively corresponding to input voltage Vin and output voltage Vout, so that the variation in the switching frequency is suppressed.

In addition, the present invention may also adopt the hysteresis PWM control system in which the comparator for comparing the ripple component and the reference voltage has hysteresis characteristics to generate a PWM signal.

That is, the present invention can be widely adopted in various ripple control system switching power supply devices.

The schemes described in said Embodiments 2 and 3 may also be adopted in other embodiments.

For example, in the switching power supply device shown in FIG. 9, one may also adopt a scheme in which voltage divider circuit 13 is arranged in parallel with capacitor Ci (FIG. 6), and the output voltage of said voltage divider circuit 13 is input to signal synthesizer 15. Also, one may adopt a scheme in which CR integrator 11 is replaced by CR integrator 11B (FIG. 7), with voltage divider circuit 13B (FIG. 7) arranged in parallel with capacitor Ci, and with the output voltage of voltage divider circuit 13B input to signal synthesizer 15.

One may also adopt a scheme in which the switching power supply device shown in FIG. 11 has voltage divider circuit 13 arranged in parallel with capacitor Ci (FIG. 6), and the output voltage of voltage divider circuit 13 is input to amplitude converter 16. In another scheme that may be adopted, CR integrator 11 is replaced by CR integrator 11B (FIG. 7), and voltage divider circuit 13B is arranged in parallel with its capacitor Ci (FIG. 7), while voltage divider circuit 14 is arranged for dividing output feedback voltage VFB, and the output voltage difference between voltage divider circuit 13B and voltage divider circuit 14 is input to amplitude converter 16.

One may also adopt the following scheme: in the switching power supply device shown in FIG. 13, voltage divider circuit 13 is arranged in parallel with capacitor Ci (FIG. 6), and the output voltage of voltage divider circuit 13 is input to signal synthesizer 17. In yet another scheme that may be adopted, CR integrator 11 is replaced by CR integrator 11B (FIG. 7), and voltage divider circuit 13B is arranged in parallel with its capacitor Ci (FIG. 7), while voltage divider circuit 14 is arranged for dividing output feedback voltage VFB, and the output voltage difference between voltage divider circuit 13B and voltage divider circuit 14 is input to signal synthesizer 17.

In said Embodiment 1, current Iq is injected into resistor R3 arranged in the transmission path of output feedback voltage VFB. However, the present invention is not limited to this scheme. For example, one may also adopt a scheme in which opposite to the aforementioned scheme, current Iq is injected into resistor R4 on the transmission path of reference voltage Vref. That is, a synthetic signal comprising reference voltage Vref and the ripple signal is generated. In this case, by injecting the same current Iq also in node N1, the DC balance of currents flowing if pnp transistors Q3, Q4 is improved, and the input offset voltage error can be reduced.

Although the present invention has been described in detail, it should be understood that various changes, substitutions and alterations can be made hereto without departing from the spirit and scope of the invention as defined by the appended claims.

The invention claimed is:

1. A switching power supply device comprising:
a first capacitor having an output voltage generated there across;
an inductor in the current supply path to said first capacitor;
a switching circuit that switches voltage applied to said inductor responsive to an input control signal;
a ripple signal generator that generates a ripple signal corresponding to the ripple current flowing through said inductor on the basis of the voltage applied to said inductor, wherein said ripple signal generator has an integrator containing a second capacitor that generates a voltage corresponding to the integration value of the voltage applied to said inductor;

a comparator that compares a synthetic signal of a voltage feedback signal corresponding to said output voltage and said ripple signal with a reference signal, or compares said synthetic signal of the ripple signal and reference signal with the voltage feedback signal corresponding to said output voltage;

a controller that generates said control signal corresponding to the comparison result of said comparator so that the peak or trough of said synthetic signal is equal to said reference signal or said voltage feedback signal; and an amplitude converter that generates said ripple signal, which is a signal related to the ripple voltage generated at said second capacitor, whose amplitude is less than said ripple voltage.

2. The switching power supply device described in claim 1, wherein:

said comparator has a first resistor arranged in the transmission path of said voltage feedback signal or the transmission path of said reference signal; and said amplitude converter has a voltage/current converter that converts the ripple voltage generated in said second capacitor into a current that is injected into said first resistor.

3. The switching power supply device described in claim 2, wherein said comparator comprises:

a first buffer circuit into which said voltage feedback signal is input;

a second buffer circuit into which said reference signal is input;

and an amplifier section that amplifies the voltage difference between said voltage feedback signal input via said first buffer circuit and said reference voltage input via said second buffer circuit; and wherein said first resistor is arranged in the path for transmission of said voltage feedback signal from said first buffer circuit to said amplifier section, or in the path for transmission of said reference signal from said second buffer circuit to said amplifier section;

and said current/voltage converter injects into said converted current the signal transmission path between said first resistor and said amplifier section.

4. The switching power supply device described in claim 3, wherein said current/voltage converter also injects the current equivalent to said converted current injected via said first resistor into the output of one buffer circuit of said first buffer circuit and said second buffer circuit into the other buffer circuit of said first buffer circuit and said second buffer circuit.

5. The switching power supply device described in claim 2, wherein:

said amplitude converter has a voltage divider circuit that divides the voltage generated on said second capacitor; and said voltage/current converter converts the voltage obtained by voltage division with said voltage divider circuit into current.

6. The switching power supply device described in claim 2, wherein:

said inductor and said first capacitor are connected in series;

said switching circuit switches the voltage applied to said series circuit corresponding to said control signal;

said integrator is connected in series with said series circuit;

said amplitude converter has a first voltage divider circuit that divides the voltage generated on said second capacitor;

and a second voltage divider circuit that divides said output voltage generated at said first capacitor with a voltage division ratio equivalent to said first voltage divider circuit; and wherein said current/voltage converter converts the voltage difference obtained by voltage division with said first voltage divider circuit and that obtained by voltage division with said second voltage divider circuit.

7. The switching power supply device described in claim 1, wherein said amplitude converter has:

a voltage divider circuit that divides the voltage generated on said second capacitor; and an amplifier that amplifies/attenuates the voltage obtained by voltage division with said voltage divider circuit.

8. The switching power supply device described in claim 1, wherein:

said inductor and said first capacitor are connected in series;

said switching circuit switches the voltage applied to said series circuit;

said integrator is connected in series with said series circuit;

and wherein said amplitude converter comprises:

a first voltage divider circuit that divides the voltage generated on said second capacitor;

a second voltage divider circuit that divides said output voltage generated on said first capacitor with a voltage division ratio equal to that of said first voltage divider circuit; and a circuit that attenuates or amplifies the voltage difference obtained by voltage division with said first voltage divider circuit and that obtained by voltage division with said second voltage divider circuit.

9. The switching power supply device described in claim 1, wherein:

said amplitude converter has a first signal synthesis circuit that synthesizes the ripple voltage generated on said second capacitor and said voltage feedback signal;

and said comparator compares the synthetic signal of said first signal synthesis circuit and said reference signal.

10. The switching power supply device described in claim 9, wherein said reference signal is input to said first signal synthesis circuit instead said voltage feedback signal, and said circuit generates a DC offset component containing said synthetic signal so that said synthetic signal output is equivalent to said reference signal when zero voltage is input instead of the ripple voltage generated at said second capacitor.

11. The switching power supply device described in claim 1, wherein:

said amplitude converter has a second signal synthesis circuit that synthesizes the ripple voltage generated at said second capacitor and said reference signal; and said comparator compares the synthetic signal of said second signal synthesis circuit and said voltage feedback signal.

12. The switching power supply device described in claim 1, wherein said comparator comprises:

a first amplifier section that generates a first differential current corresponding to the voltage difference between said voltage feedback signal and said reference signal;

a second amplifier section that generates a second differential current corresponding to the voltage difference between the two ends of said second capacitor;

a first current synthesis node that synthesizes one current of said first differential current and one current of said second differential current;

a second current synthesis node that synthesizes the other current of said first differential current and the other current of said second differential current;

a first load circuit into which the synthetic current of said first current synthesis node flows;

a second load circuit into which the synthetic current of said second current synthesis node flows; and a third amplifier section that amplifies the voltage difference between the voltage generated in said first load circuit and the voltage generated in said second load circuit.

13. A switching power supply device comprising:

a switching power supply device comprising:

an input terminal that receives the input voltage;

an output terminal that outputs the output voltage;

a first switching transistor connected between said input terminal and the first node;

a second switching transistor, which is connected between said first node and the reference potential, and which performs an operation complementary to that of said first switching transistor;

an inductance element connected between said first node and said output terminal;

an output capacitance element connected between said output terminal and the reference potential;

a voltage division circuit, which is connected to said output terminal and generates a feedback voltage related to said output voltage;

a ripple voltage detector that detects the ripple voltage, which is contained in said feedback voltage and corresponds to the switching operation of said switching transistor;

a comparator that compares the sum of said feedback voltage and said ripple voltage and outputs the comparison result;

and a controller that turns on/off said first and second switching transistors responsive to said comparison result, wherein said ripple voltage detector contains a differential circuit connected to said inductance element; and the on-time of said first switching transistor is defined by the product of the ratio of said output voltage to said input voltage and the switching period of said first and second switching transistors.

14. The switching power supply device described in claim 3, wherein:

said amplitude converter has a voltage divider circuit that divides the voltage generated on said second capacitor; and said voltage/current converter converts the voltage obtained by voltage division with said voltage divider circuit into current.

15. The switching power supply device described in claim 4, wherein:

said amplitude converter has a voltage divider circuit that divides the voltage generated on said second capacitor; and said voltage/current converter converts the voltage obtained by voltage division with said voltage divider circuit into current.

16. The switching power supply device described in claim 3, wherein:

said inductor and said first capacitor are connected in series;

said switching circuit switches the voltage applied to said series circuit corresponding to said control signal;

said integrator is connected in series with said series circuit;

said amplitude converter has a first voltage divider circuit that divides the voltage generated on said second capacitor;

and a second voltage divider circuit that divides said output voltage generated at said first capacitor with a voltage division ratio equivalent to said first voltage divider circuit; and wherein said current/voltage converter converts the voltage difference obtained by voltage division with said first voltage divider circuit and that obtained by voltage division with said second voltage divider circuit.

17. The switching power supply device described in claim 4, wherein:

said inductor and said first capacitor are connected in series;

said switching circuit switches the voltage applied to said series circuit corresponding to said control signal;

said integrator is connected in series with said series circuit;

said amplitude converter has a first voltage divider circuit that divides the voltage generated on said second capacitor;

and a second voltage divider circuit that divides said output voltage generated at said first capacitor with a voltage division ratio equivalent to said first voltage divider circuit; and wherein said current/voltage converter converts the voltage difference obtained by voltage division with said first voltage divider circuit and that obtained by voltage division with said second voltage divider circuit.

* * * * *